(12) United States Patent
Brychell et al.

(10) Patent No.: US 8,490,015 B2
(45) Date of Patent: Jul. 16, 2013

(54) TASK DIALOG AND PROGRAMMING INTERFACE FOR SAME

(75) Inventors: Joseph J. Brychell, Kirkland, WA (US); Mark D. Coburn, Sammamish, WA (US); Charles Cummins, Seattle, WA (US); Jan T. Miksovsky, Seattle, WA (US); Jeffrey S. Miller, Woodinville, WA (US); Vincent J. Pasceri, Redmond, WA (US); Randall K. Winjum, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 11/106,714

(22) Filed: Apr. 15, 2005

(65) Prior Publication Data

US 2006/0236252 A1  Oct. 19, 2006

(51) Int. Cl.
*G06F 3/048* (2006.01)

(52) U.S. Cl.
USPC ............ 715/809; 715/764; 715/765; 715/808

(58) Field of Classification Search
USPC .................................. 715/808, 809
See application file for complete search history.

(56) References Cited

U.S. PATENT DOCUMENTS

| | | |
|---|---|---|
| 5,241,671 A | 8/1993 | Reed et al. |
| 5,333,315 A | 7/1994 | Saether et al. |
| 5,388,196 A | 2/1995 | Pajak et al. |
| 5,461,710 A | 10/1995 | Bloomfield et al. |
| 5,499,364 A | 3/1996 | Klein et al. |
| 5,504,852 A | 4/1996 | Thompson-Rohrlich |
| 5,513,306 A | 4/1996 | Mills et al. |
| 5,559,948 A | 9/1996 | Bloomfield et al. |
| 5,598,524 A | 1/1997 | Johnston, Jr. et al. |
| 5,630,042 A | 5/1997 | McIntosh et al. |
| 5,680,563 A | 10/1997 | Edelman |

(Continued)

FOREIGN PATENT DOCUMENTS

| | | |
|---|---|---|
| CN | 1421800 | 11/2001 |
| GB | 2329492 | 3/1999 |

(Continued)

OTHER PUBLICATIONS

Computer-Viren: Kurzbeschreibungen zu Computer-Viren, Dec. 10, 2002, BIS, http://web.archive.org/web/20021210051950/http://www.bsi.bund.de/av/vb/friendgreet.htm.*

(Continued)

*Primary Examiner* — Matt Kim
*Assistant Examiner* — Yongjia Pan
(74) *Attorney, Agent, or Firm* — Shook, Hardy & Bacon L.L.P.

(57) ABSTRACT

A task dialog having a main instruction and a command region, and optionally a content and/or footer region, is automatically generated in response to a request from an application program. The task dialog main instruction is automatically sized and located so as to form a concise instruction or question located prominently in the dialog. A command region is below the instruction and includes UI controls for responding to the dialog. Optional content and footer regions can be used by a developer for inclusion of text that provides guidance to the user regarding the main instruction. If included, however, the content and/or footer regions are automatically sized and placed so that they do not obscure the main instruction or the command region controls.

18 Claims, 24 Drawing Sheets

U.S. PATENT DOCUMENTS

| | | | |
|---|---|---|---|
| 5,696,486 A | 12/1997 | Poliquin et al. | |
| 5,757,925 A | 5/1998 | Faybishenko | |
| 5,790,121 A | 8/1998 | Sklar et al. | |
| 5,802,516 A | 9/1998 | Shwarts et al. | |
| 5,821,928 A * | 10/1998 | Melkus et al. | 715/809 |
| 5,821,932 A * | 10/1998 | Pittore | 715/809 |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,867,163 A | 2/1999 | Kurtenbach | |
| 5,875,446 A | 2/1999 | Brown et al. | |
| 5,878,410 A | 3/1999 | Zbikowski et al. | |
| 5,899,995 A | 5/1999 | Millier et al. | |
| 5,923,328 A | 7/1999 | Griesmer | |
| 5,929,854 A | 7/1999 | Ross | |
| 5,933,139 A | 8/1999 | Feigner et al. | |
| 5,935,210 A | 8/1999 | Stark | |
| 5,959,624 A * | 9/1999 | Johnston et al. | 715/746 |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,021,262 A | 2/2000 | Cote et al. | |
| 6,023,708 A | 2/2000 | Mendez et al. | |
| 6,025,843 A | 2/2000 | Sklar | |
| 6,037,944 A | 3/2000 | Hugh | |
| 6,061,692 A | 5/2000 | Thomas et al. | |
| 6,061,695 A | 5/2000 | Slivka et al. | |
| 6,078,924 A | 6/2000 | Ainsbury et al. | |
| 6,097,389 A | 8/2000 | Morris et al. | |
| 6,144,968 A | 11/2000 | Zellweger | |
| 6,147,601 A | 11/2000 | Sandelman et al. | |
| 6,181,342 B1 | 1/2001 | Niblack | |
| 6,188,399 B1 * | 2/2001 | Voas et al. | 715/723 |
| 6,202,061 B1 | 3/2001 | Khosla et al. | |
| 6,237,011 B1 | 5/2001 | Ferguson et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 | 7/2001 | Meijer et al. | |
| 6,275,829 B1 | 8/2001 | Angiulo et al. | |
| 6,308,173 B1 | 10/2001 | Glasser et al. | |
| 6,317,142 B1 | 11/2001 | Decoste et al. | |
| 6,324,551 B1 | 11/2001 | Lamping et al. | |
| 6,339,767 B1 | 1/2002 | Rivette et al. | |
| 6,341,280 B1 | 1/2002 | Glass et al. | |
| 6,363,377 B1 | 3/2002 | Kravets et al. | |
| 6,363,400 B1 | 3/2002 | Chtchetkine et al. | |
| 6,363,503 B1 * | 3/2002 | Clauss et al. | 714/57 |
| 6,401,097 B1 | 6/2002 | McCotter et al. | |
| 6,411,311 B1 | 6/2002 | Rich et al. | |
| 6,430,575 B1 | 8/2002 | Dourish et al. | |
| 6,437,807 B1 | 8/2002 | Berquist et al. | |
| 6,448,985 B1 | 9/2002 | McNally | |
| 6,453,311 B1 | 9/2002 | Powers, III | |
| 6,453,319 B1 | 9/2002 | Mattis et al. | |
| 6,466,238 B1 | 10/2002 | Berry et al. | |
| 6,466,932 B1 | 10/2002 | Dennis et al. | |
| 6,480,835 B1 | 11/2002 | Light | |
| 6,505,233 B1 | 1/2003 | Hanson et al. | |
| 6,513,038 B1 | 1/2003 | Hasegawa et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,549,217 B1 | 4/2003 | De Greef et al. | |
| 6,549,916 B1 | 4/2003 | Sedlar | |
| 6,563,514 B1 | 5/2003 | Samar | |
| 6,565,608 B1 * | 5/2003 | Fein et al. | 715/255 |
| 6,573,906 B1 | 6/2003 | Harding et al. | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | |
| 6,628,309 B1 | 9/2003 | Dodson et al. | |
| 6,628,311 B1 * | 9/2003 | Fang | 715/777 |
| 6,636,238 B1 | 10/2003 | Amir et al. | |
| 6,636,250 B1 | 10/2003 | Gasser | |
| 6,662,198 B2 | 12/2003 | Satyanarayanan et al. | |
| 6,684,222 B1 | 1/2004 | Cornelius et al. | |
| 6,735,623 B1 | 5/2004 | Prust | |
| 6,738,770 B2 | 5/2004 | Gorman | |
| 6,745,206 B2 | 6/2004 | Mandler et al. | |
| 6,754,829 B1 | 6/2004 | Butt et al. | |
| 6,762,776 B2 | 7/2004 | Huapaya | |
| 6,762,777 B2 | 7/2004 | Carroll | |
| 6,763,458 B1 | 7/2004 | Watanabe et al. | |
| 6,768,999 B2 | 7/2004 | Prager et al. | |
| 6,784,900 B1 | 8/2004 | Dobronsky et al. | |
| 6,795,094 B1 | 9/2004 | Watanabe et al. | |
| 6,801,919 B2 | 10/2004 | Hunt et al. | |
| 6,803,926 B1 | 10/2004 | Lamb et al. | |
| 6,816,863 B2 | 11/2004 | Bates et al. | |
| 6,823,344 B1 | 11/2004 | Isensee et al. | |
| 6,847,959 B1 | 1/2005 | Arrouye et al. | |
| 6,853,391 B2 | 2/2005 | Bates et al. | |
| 6,865,568 B2 | 3/2005 | Chau | |
| 6,871,348 B1 | 3/2005 | Cooper | |
| 6,874,125 B1 * | 3/2005 | Carroll et al. | 715/705 |
| 6,876,996 B2 | 4/2005 | Czajkowski et al. | |
| 6,880,132 B2 | 4/2005 | Uemura | |
| 6,883,009 B2 | 4/2005 | Yoo | |
| 6,883,146 B2 | 4/2005 | Prabhu et al. | |
| 6,906,722 B2 | 6/2005 | Hrebejk et al. | |
| 6,922,709 B2 | 7/2005 | Goodman | |
| 6,938,207 B1 | 8/2005 | Haynes | |
| 6,944,647 B2 | 9/2005 | Shah et al. | |
| 6,947,959 B1 | 9/2005 | Gill | |
| 6,950,818 B2 | 9/2005 | Dennis et al. | |
| 6,952,724 B2 | 10/2005 | Prust | |
| 6,980,993 B2 | 12/2005 | Horvitz et al. | |
| 7,010,755 B2 | 3/2006 | Anderson et al. | |
| 7,051,291 B2 | 5/2006 | Sciammarella et al. | |
| 7,068,291 B1 | 6/2006 | Roberts et al. | |
| 7,139,811 B2 | 11/2006 | Lev Ran et al. | |
| 7,203,948 B2 | 4/2007 | Mukundan et al. | |
| 7,257,537 B2 * | 8/2007 | Ross et al. | 704/270 |
| 2001/0034771 A1 | 10/2001 | Hutsch et al. | |
| 2001/0045961 A1 * | 11/2001 | Stoakley et al. | 345/744 |
| 2001/0047368 A1 | 11/2001 | Oshinsky et al. | |
| 2001/0049675 A1 | 12/2001 | Mandler et al. | |
| 2001/0053996 A1 | 12/2001 | Atkinson | |
| 2001/0056434 A1 | 12/2001 | Kaplan et al. | |
| 2001/0056508 A1 * | 12/2001 | Arneson et al. | 709/318 |
| 2002/0019935 A1 | 2/2002 | Andrew et al. | |
| 2002/0033844 A1 | 3/2002 | Levy et al. | |
| 2002/0046232 A1 | 4/2002 | Adams et al. | |
| 2002/0046299 A1 | 4/2002 | Lefeber et al. | |
| 2002/0049717 A1 | 4/2002 | Routtenberg et al. | |
| 2002/0052885 A1 | 5/2002 | Levy | |
| 2002/0054167 A1 | 5/2002 | Hugh | |
| 2002/0059199 A1 | 5/2002 | Harvey | |
| 2002/0062310 A1 | 5/2002 | Marmor et al. | |
| 2002/0075310 A1 | 6/2002 | Prabhu et al. | |
| 2002/0075312 A1 | 6/2002 | Amadio et al. | |
| 2002/0075330 A1 | 6/2002 | Rosenzweig et al. | |
| 2002/0087740 A1 | 7/2002 | Castanho et al. | |
| 2002/0087969 A1 | 7/2002 | Brunheroto et al. | |
| 2002/0089540 A1 | 7/2002 | Geier et al. | |
| 2002/0091679 A1 | 7/2002 | Wright | |
| 2002/0091697 A1 | 7/2002 | Huang et al. | |
| 2002/0091739 A1 | 7/2002 | Ferlitsch et al. | |
| 2002/0095416 A1 | 7/2002 | Schwols | |
| 2002/0097278 A1 | 7/2002 | Mandler et al. | |
| 2002/0103998 A1 | 8/2002 | DeBruine | |
| 2002/0104069 A1 | 8/2002 | Gouge et al. | |
| 2002/0107973 A1 | 8/2002 | Lennon et al. | |
| 2002/0111942 A1 | 8/2002 | Campbell et al. | |
| 2002/0113821 A1 | 8/2002 | Hrebejk et al. | |
| 2002/0120505 A1 | 8/2002 | Henkin et al. | |
| 2002/0120757 A1 | 8/2002 | Sutherland et al. | |
| 2002/0129033 A1 | 9/2002 | Hoxie et al. | |
| 2002/0138552 A1 | 9/2002 | DeBruine et al. | |

| | | |
|---|---|---|
| 2002/0138582 A1 | 9/2002 | Chandra et al. |
| 2002/0138744 A1 | 9/2002 | Schleicher et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0184357 A1 | 12/2002 | Traversat et al. |
| 2002/0188605 A1 | 12/2002 | Adya et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |
| 2003/0009484 A1 | 1/2003 | Hamanaka et al. |
| 2003/0014415 A1 | 1/2003 | Weiss et al. |
| 2003/0018657 A1 | 1/2003 | Monday |
| 2003/0018712 A1 | 1/2003 | Harrow et al. |
| 2003/0028610 A1 | 2/2003 | Pearson |
| 2003/0041178 A1 | 2/2003 | Brouk et al. |
| 2003/0046260 A1 | 3/2003 | Satyanarayanan et al. |
| 2003/0069893 A1 | 4/2003 | Kanai et al. |
| 2003/0069908 A1 | 4/2003 | Anthony et al. |
| 2003/0074356 A1 | 4/2003 | Kaler et al. |
| 2003/0078918 A1 | 4/2003 | Souvignier et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Tararoukhine et al. |
| 2003/0184587 A1 | 10/2003 | Ording et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056894 A1 * | 3/2004 | Zaika et al. ............ 345/762 |
| 2004/0056896 A1 | 3/2004 | Doblmayr et al. |
| 2004/0068524 A1 | 4/2004 | Aboulhosn et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0117358 A1 | 6/2004 | Von Kaenel et al. |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0080807 A1 | 4/2005 | Beilinson et al. |
| 2005/0091611 A1 * | 4/2005 | Colleran et al. ............ 715/804 |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0149481 A1 | 7/2005 | Hesselink et al. |
| 2005/0166148 A1 * | 7/2005 | Garding ............ 715/708 |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0080308 A1 | 4/2006 | Carpentier et al. |
| 2006/0095860 A1 * | 5/2006 | Wada et al. ............ 715/771 |
| 2006/0129627 A1 | 6/2006 | Phillips et al. |
| 2006/0173873 A1 | 8/2006 | Prompt et al. |
| 2006/0174202 A1 * | 8/2006 | Bonner ............ 715/750 |
| 2006/0200466 A1 | 9/2006 | Kaasten et al. |
| 2006/0200832 A1 | 9/2006 | Dutton |
| 2006/0218122 A1 | 9/2006 | Poston et al. |
| 2006/0236253 A1 * | 10/2006 | Gusmorino et al. ............ 715/762 |

FOREIGN PATENT DOCUMENTS

| | | |
|---|---|---|
| WO | 9938092 | 7/1999 |
| WO | 01/63919 A1 | 8/2001 |
| WO | WO 0225420 | 3/2002 |
| WO | WO 2004107151 | 9/2004 |

OTHER PUBLICATIONS

Windows XP Service Pack 2 and the Internet in a Managed Environment: Windows Error Reporting, Aug. 6, 2004, Microsoft TechNet, http://technet.microsoft.com/en-us/library/bb457179.aspx.*

Sheryl Canter, Windows Error Reporting Under the Covers, Mar. 16, 2004, O'Reilly Media Inc, http://www.windowsdevcenter.com/pub/a/windows/2004/03/16/wer.html.*

Windows Error Reporting, Sep. 14, 2004, meryl.net, http://meryl.net/2004/09/14/windows-error-reporting/.*
Dialog Boxes, May 15, 2001, 4 pages.*
Bott, et al., Book titled "Special Edition Using Windows 98, Second Edition", Dec. 21, 1999, second edition, pp. 1-7.
Supplementary European Search Report for EP 04780390 dated Jun. 18, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
International Search Report and Written Opinion of PCT/US04/25931 dated Apr. 3, 2007.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Written Opinion of Singapore Application No. 200403220-7 dated May 18, 2006.
Microsoft Press Pass, "Windows XP is Here!", New York, Oct. 25, 2001.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
European Search Report for 03007909.9-2211 dated Jun. 30, 2006.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Australian Search Report for SG 200301764-7 dated Mar. 30, 2006.
D. Esposito, Visual C++ Windows Shell Programming, Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35$^{th}$ Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) dated Nov. 11, 2004.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualIFS: A New Journaling File System Without Meta-Data Duplication," Conference Proceedings of the 2002 International Conference on Supercomputing, New York, Jun. 22-26, 2002, p. 137-146.
Manber, U., and S. Wu, "GLIMPSE: A Tool to Search Through Entire File Systems," Proceedings of USENIX Winter 1994 Conference, San Francisco, Ca, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE—Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part 1, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal FrameWork for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

* cited by examiner

TASK DIALOG AND PROGRAMMING INTERFACE FOR SAME

FIELD OF THE INVENTION

The invention generally relates to computer user interfaces (UIs) and to creation of user interfaces. More specifically, embodiments of this invention relate to dialog UIs and to programming interfaces allowing software developers to more conveniently create such dialogs.

BACKGROUND OF THE INVENTION

The use of dialogs as part of a computer's graphical user interface (GUI) is known. As used herein, a "dialog" includes a window or other portion of a graphical computer display which appears in order to communicate information from a computer program and/or obtain information from the user. A familiar example is the "message box" dialog used in various versions of the WINDOWS operating system (available from Microsoft Corporation of Redmond, Wash.). A message box often contains a brief message (e.g., "Save file before closing program?") and one or more graphical buttons for possible responses (e.g., "yes," "no," "ok," etc.). Dialogs are also used for more complex purposes, such as editing properties of an object, adjusting operational parameters of a program, etc. Some dialogs can be quite extensive and open-ended. In other words, the dialog may present the user with a large number of possible options; some of those options may be loosely related or unrelated, and the user may not be given clear direction about what is required.

A well-designed dialog permits a user to interact very efficiently with a computer program. Although criteria for evaluating dialogs can vary, a good dialog will often make it easy for a user to quickly understand what is needed and what the response options may be. Unfortunately, dialogs are often misused and/or poorly designed by software developers. In some cases, a user must carefully study a dialog in order to derive what information the computer program is conveying and/or seeking. This can require excessive time and try the user's patience. Even if the user is able to determine what a badly-designed dialog is seeking, the proper response may not be readily apparent. This can result in a user selecting an undesired option, and may cause serious problems.

Consistency across dialogs generated by various computer programs is also an area of concern. In many environments, a single computer will often have software from numerous sources. One company may develop the operating system (OS), while other companies may develop individual application programs. The OS and other programs executing on the computer may all generate dialogs to obtain user input and/or advise the user of important information. If all of these dialogs have a similar design, the user becomes accustomed to a general dialog format. The user then knows where to look in each dialog for important information and can thereby respond more quickly. If the dialogs have different layouts and are otherwise not consistent in how they communicate information and seek user input, the user may be required to spend more time studying each dialog. In part to promote consistent dialog design, various guidelines have been promulgated. Unfortunately, software developers frequently fail to observe such guidelines. The developers may be unaware of or not fully understand the guidelines, or may simply be unwilling to follow them.

Software developers create dialogs in various manners. For example, various versions of the WINDOWS operating system provide a MessageBox function. A software developer can include this function in a program in order to generate a message box type of dialog. When calling the MessageBox function, an application program passes several parameters to the OS, including a pointer to a text string and details regarding various buttons to be displayed for a user response ("Ok," "Cancel," etc.). The OS then generates a message box dialog displaying the text string and providing any response buttons specified in the function call. The MessageBox function is well suited to creating relatively simple dialogs. However, many developers overuse this function. Specifically, developers often attempt to "shoe horn" a more complex dialog into a message box. As one example, some developers treat the text region of a message box as a monolithic block and expect the user to fully read and digest all of that text. This can result in dialogs such as is illustrated in FIG. 1. In the example of FIG. 1, the message is not concise and the most important information can be hidden from the user. Moreover, expecting all users to carefully review such detailed text within a dialog ignores the reality that many users are impatient and unwilling to read extensive dialog text.

Other tools are available that permit a developer to generate more complex dialogs that may not be suitable for message boxes. However, these tools require substantially more effort on a developer's part. Instead of simply calling a function that passes a pointer to text and specifies certain buttons, the developer must carefully specify the sizes, shapes and positions of many or all of the dialog components. For example, suppose a developer wished to display a single prominent message, to provide a number of response option controls (e.g., buttons), and to place a brief description by each of those controls. The developer would have to specify the size, shape and position of the prominent message; the sizes, shapes and positions of the response controls; and the sizes, shapes and positions of the response control descriptions. Human nature and the economics of software development dissuade many developers from investing the time to code a well-designed dialog.

For these and other reasons, there remains a need for methods and systems to assist software developers in creating better dialog user interfaces.

SUMMARY OF THE INVENTION

Embodiments of the invention address these and other challenges. In at least some embodiments, a task dialog is automatically generated in response to a request from an application program. The request need not contain data regarding placement and sizing of various task dialog elements. However, the resulting task dialog has a main instruction that is automatically sized and located so as to form a concise instruction or question located prominently in the dialog. A command region is below the instruction and includes UI controls for responding to the dialog. Optional content and footer regions can be used by the developer for inclusion of supplemental text that provides guidance to the user regarding the main instruction. If included, however, the content and/or footer regions are automatically sized and placed so that they do not obscure the main instruction or the command region controls.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 3A through 3J are examples of task dialog user interfaces according to at least some embodiments of the invention.

DETAILED DESCRIPTION OF THE PREFERRED EMBODIMENTS

The following detailed description is divided into three parts. Part I describes an example of a computer system environment in which embodiments of the invention may be implemented. Part II describes examples of at least some programming interfaces which can be used to implement embodiments of the invention. Part III describes embodiments of task dialog user interfaces (UIs) and methods for implementing task dialogs.

I. Example Computing System Environment

Figure 2A:
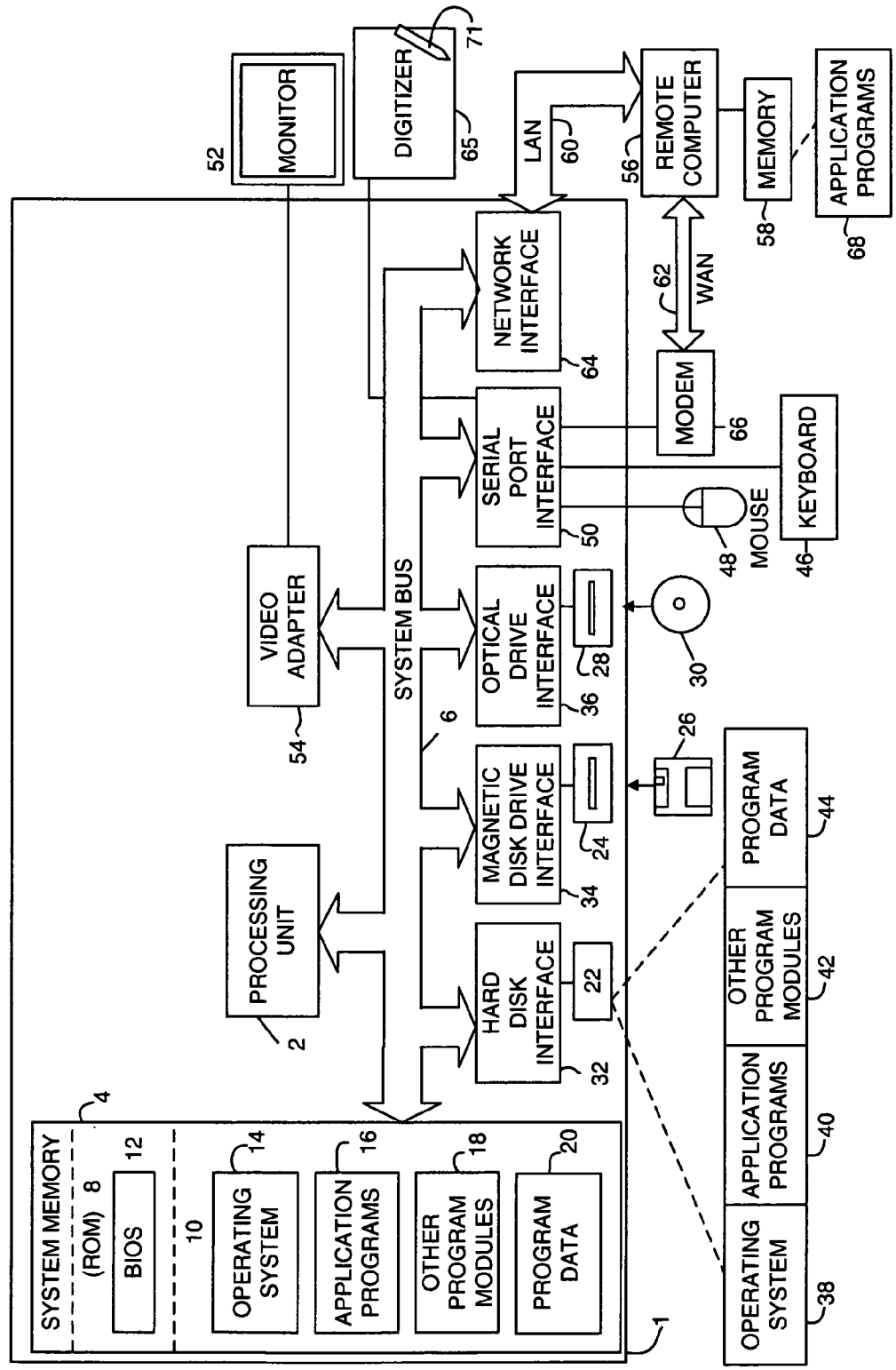
FIG. 2A is a block diagram of an example of a computing system environment in which embodiments of the invention may be implemented.

FIG. 2A illustrates an example of a suitable computing system environment in which the invention may be implemented. The computing system environment is only one example of a suitable computing environment and is not intended to suggest any limitation as to the scope of use or functionality of the invention. Neither should the computing environment of FIG. 2A be interpreted as having any dependency or requirement relating to any one or combination of components illustrated in the exemplary computing environment. Embodiments of the invention will also be described using as examples data structures found in various versions of the WINDOWS operating system. However, the invention is not limited to implementation in connection with a specific operating system.

The invention is operational with numerous other general purpose or special purpose computing system environments or configurations. Examples of well known computing systems, environments and/or configurations that may be suitable for use with the invention include, but are not limited to, personal computers, hand-held or laptop devices, multiprocessor systems, microprocessor-based systems, minicomputers, and the like. The invention is described in the general context of computer-executable instructions, such as program modules, being executed by a computer. Generally, program modules include routines, objects, components, data structures, etc. that perform particular tasks or implement particular abstract data types.

With reference to FIG. 2A, an exemplary system for implementing the invention includes a general purpose computing device in the form of a computer 1. Hardware components of computer 1 may include, but are not limited to, processing unit 2, system memory 4 and system bus 6 that couples various system components (including system memory 4) to processing unit 2. System bus 6 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus also known as Mezzanine bus.

Computer 1 typically includes a variety of computer readable media. Computer readable media can be any available media that can be accessed by computer 1 and includes both volatile and nonvolatile media, removable and non-removable media. By way of example, and not limitation, computer readable media may include computer storage media and communication media. Computer storage media includes volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 4 includes computer storage media in the form of volatile and/or nonvolatile memory such as read only memory (ROM) 8 and random access memory (RAM) 10. Basic input/output system 12 (BIOS), containing the basic routines that help to transfer information between elements within computer 1, such as during start-up, is typically stored in ROM 8. RAM 10 typically contains data and/or program modules that are immediately accessible to and/or presently being operated on by processing unit 2. By way of example, and not limitation, FIG. 2A illustrates operating system (OS) 14, application programs 16, other program modules 18 and program data 20.

Computer 1 may also include other removable/non-removable, volatile/nonvolatile computer storage media. By way of example only, FIG. 2A illustrates hard disk drive 22 that reads from or writes to non-removable, nonvolatile magnetic media, magnetic disk drive 24 that reads from or writes to removable, nonvolatile magnetic disk 26 and optical disk drive 28 that reads from or writes to removable, nonvolatile optical disk 30 such as a CD ROM, CDRW, DVD or other optical media. Other removable/non-removable, volatile/nonvolatile computer storage media that can be used in the exemplary operating environment include, but are not limited to, magnetic tape cassettes, flash memory cards, digital video tape, solid state RAM, solid state ROM, and the like. Hard disk drive 22 is typically connected to system bus 6 through a non-removable memory interface such as interface 32, and magnetic disk drive 24 and optical disk drive 28 are typically connected to system bus 6 by a removable memory interface, such as interfaces 34 and 36.

The drives and their associated computer storage media, discussed above and illustrated in FIG. 2A, provide storage of computer readable instructions, data structures, program modules and other data for computer 1. In FIG. 2A, for example, hard disk drive 22 is illustrated as storing OS 38, application programs 40, other program modules 42 and program data 44. Note that these components can either be the same as or different from OS 14, application programs 16, other program modules 18 and program data 20. OS 38, application programs 40, other program modules 42 and program data 44 are given different numbers here to illustrate that, at a minimum, they are different copies. A user may enter commands and information into computer 1 through input devices such as keyboard 46, pointing device 48 (shown as a mouse, but which could be a trackball or touch pad) and stylus 71 (shown in conjunction with digitizer 65). Other input devices (not shown) may include a microphone, joystick, game pad, satellite dish, scanner, or the like. These and other input devices are often connected to processing unit 2 through user input interface 50 that is coupled to the system bus. Although mouse 48, keyboard 46, digitizer 65 and modem 66 are shown in FIG. 2A as connected to computer 1 through a serial port, these and other devices may be connected to computer 1 through other ports (e.g., a parallel port, PS/2 port, game port or a universal serial bus (USB) port) and related interfaces and structures. Monitor 52 or other type of display device is also connected to system bus 6 via an interface, such as video interface 54. In addition to the monitor, computers may also include other peripheral output devices such as speakers (not shown) and a printer (not shown), which may be connected through an output peripheral interface (not shown).

Computer 1 may operate in a networked environment using logical connections to one or more remote computers, such as remote computer 56. Remote computer 56 may be a personal computer, a server, a router, a network PC, a peer device or other common network node, and typically includes many or all of the elements described above relative to computer 1, although only memory storage device 58 has been illustrated in FIG. 2A. The logical connections depicted in FIG. 2A include local area network (LAN) 60 and wide area network (WAN) 62, but may also include other networks. Such networking environments are commonplace in offices, enterprise-wide computer networks, intranets and the Internet.

When used in a LAN networking environment, computer 1 is connected to LAN 60 through network interface or adapter 64. When used in a WAN networking environment, computer 1 may include modem 66 or other means for establishing communications over WAN 62, such as the Internet. Computer 1 may also access WAN 62 and/or the Internet via network interface 64. Modem 66, which may be internal or external, may be connected to system bus 6 via user input interface 50 or other appropriate mechanism. In a networked environment, program modules depicted relative to computer 1, or portions thereof, may be stored in the remote memory storage device. By way of example, and not limitation, FIG. 2A illustrates remote application programs 68 as residing on memory device 58. It will be appreciated that the network connections shown are exemplary and other means of establishing a communications link between computers may be used.

II. Example Programming Interfaces

A programming interface (or more simply, interface) may be viewed as any mechanism, process or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Figure 2C:
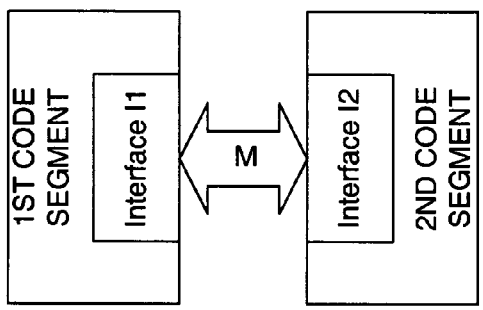
FIGS. 2B through 2M show programming interfaces, in a general-purpose computer environment, with which one or more embodiments of the present invention may be implemented.
Figure 2E:
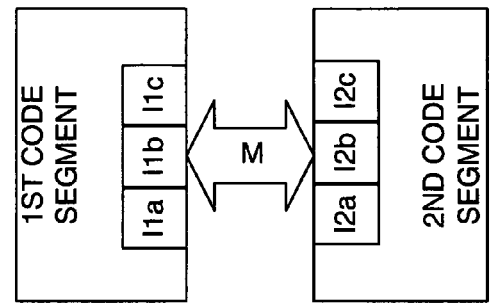
Figure 2B:
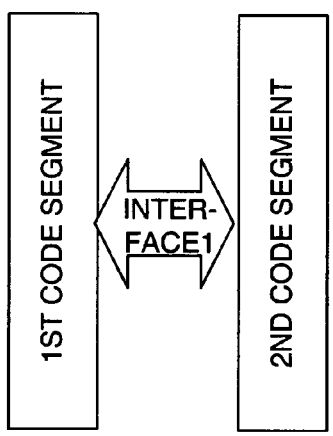

A programming interface may be viewed generically as shown in FIG. 2B or FIG. 2C. FIG. 2B illustrates an interface Interface1 as a conduit through which first and second code segments communicate. FIG. 2C illustrates an interface as comprising interface objects I1 and I2 (which may or may not be part of the first and second code segments), which enable first and second code segments of a system to communicate via medium M. In the view of FIG. 2C, one may consider interface objects I1 and I2 as separate interfaces of the same system and one may also consider that objects I1 and I2 plus medium M comprise the interface. Although FIGS. 2B and 2C show bi-directional flow and interfaces on each side of the flow, certain implementations may only have information flow in one direction and/or may only have an interface object on one side.

Aspects of a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this description should be considered illustrative and non-limiting.

The concept of a programming interface is known to those skilled in the art. There are various other ways to implement a programming interface. Such other ways may appear to be more sophisticated or complex than the simplistic view of FIGS. 2B and 2C, but they nonetheless perform a similar function to accomplish the same overall result. Some illustrative alternative implementations of a programming interface are described in connection with FIGS. 2D-2M.

Factoring.

Figure 2D:
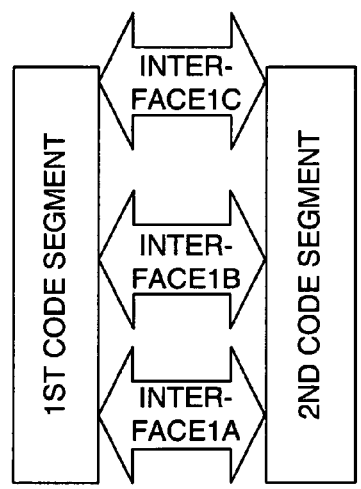

A communication from one code segment to another may be accomplished indirectly by breaking the communication into multiple discrete communications. This is depicted schematically in FIGS. 2D and 2E. As shown, some interfaces can be described in terms of divisible sets of functionality. Thus, the interface functionality of FIGS. 2B and 2C may be factored to achieve the same result, just as one may mathematically provide 24, or 2 times 2 times 3 times 2. Accordingly, as illustrated in FIG. 2D, the function provided by interface Interface1 may be subdivided to convert the communications of the interface into multiple interfaces Interface1A, Interface1B, Interface1C, etc. while achieving the same result. As illustrated in FIG. 2E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 2D and 2E, the functional spirit of interfaces Interface1 and I1 remain the same as with FIGS. 2B and 2C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Redefinition.

Figure 2G:
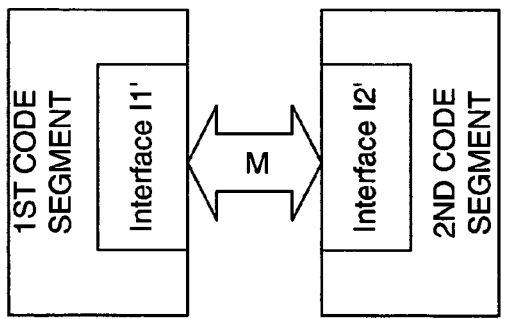
Figure 2I:
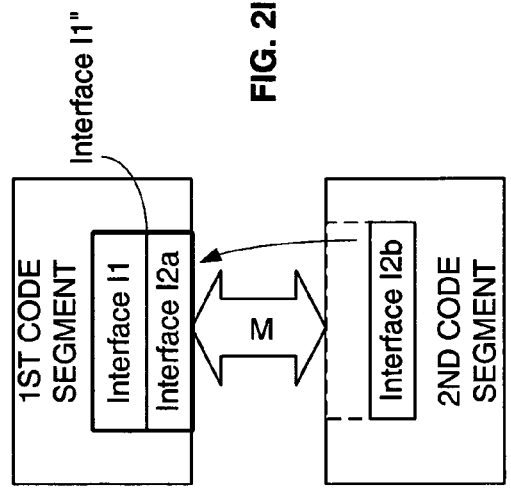
Figure 2F:
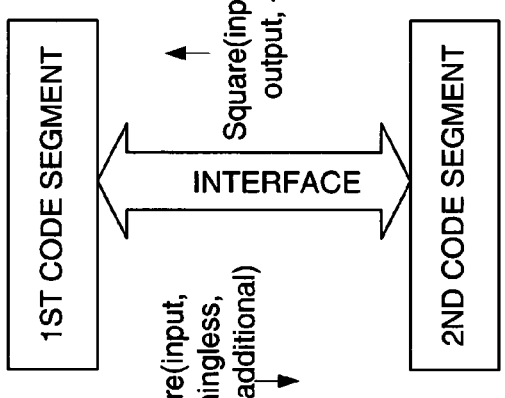

In some cases, it may be possible to ignore, add or redefine certain aspects (e.g., parameters) of a programming interface while still accomplishing the intended result. This is illustrated in FIGS. 2F and 2G. For example, assume interface Interface1 of FIG. 2B includes a function call Square(input, precision, output), a call that includes three parameters ("input," "precision" and "output") and which is issued from the 1st Code Segment to the 2nd Code Segment. If the middle parameter ("precision") is of no concern in a given scenario, as shown in FIG. 2F, it could be ignored, or replaced with another parameter. In either event, the functionality of Square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 2G, interface I1 is replaced by interface I1', redefined to ignore or add parameters to the interface. Interface I2 may similarly be redefined (as interface I2') to ignore unnecessary parameters, or parameters that may be processed elsewhere. As is clear from the foregoing, a programming interface may in some cases include aspects such as parameters which are not needed for some purpose, and which may be ignored, redefined, or processed elsewhere for other purposes.

Inline Coding.

Figure 2H:
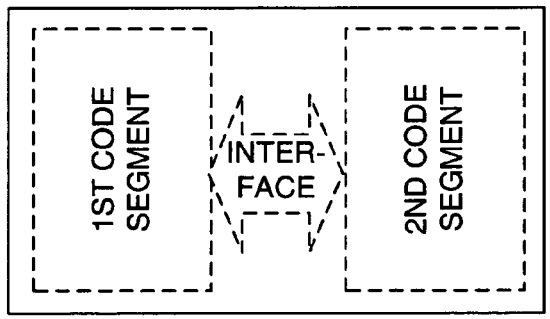

It may also be feasible to merge some or all of the functionality of two separate code modules such that the "interface" between them changes form. For example, the functionality of FIGS. 2B and 2C may be converted to the functionality of FIGS. 2H and 2I, respectively. In FIG. 2H, the previous 1st and 2nd Code Segments of FIG. 2B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 2I, part (or all) of interface I2 from FIG. 2C may be written inline into interface I1 to form interface I1". As illustrated, interface I2 is divided into I2a and I2b, and interface portion I2a has been coded in-line with interface I1 to form interface I1".

Divorce.

Figure 2K:
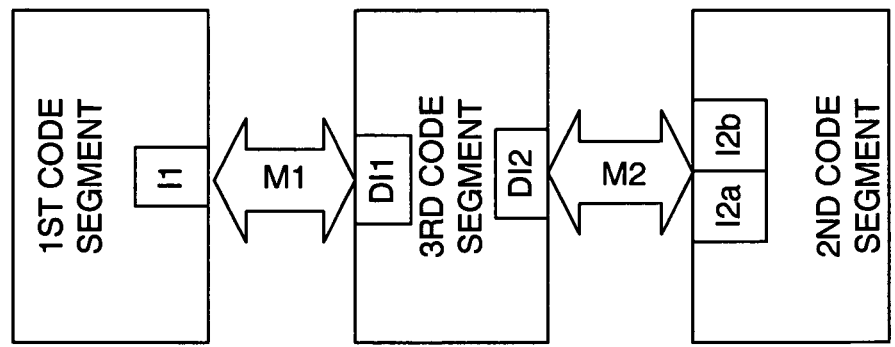
Figure 2J:
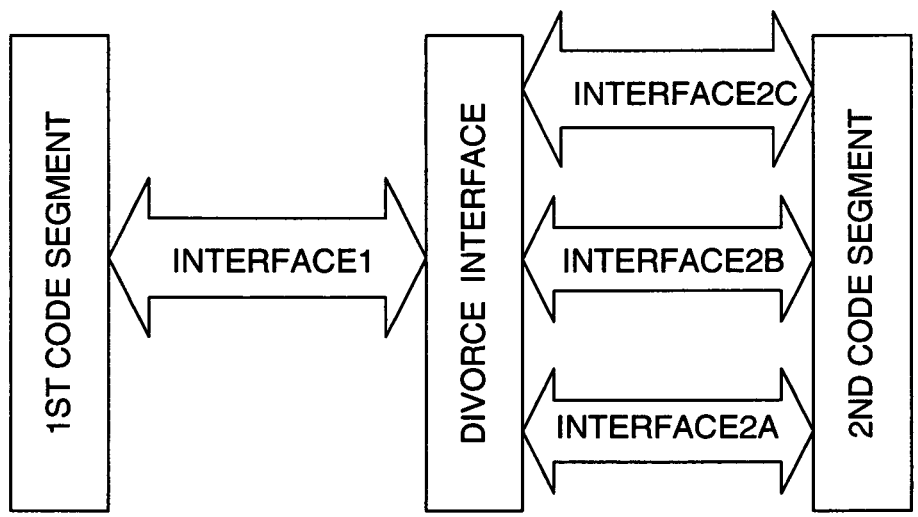
Figure 2L:
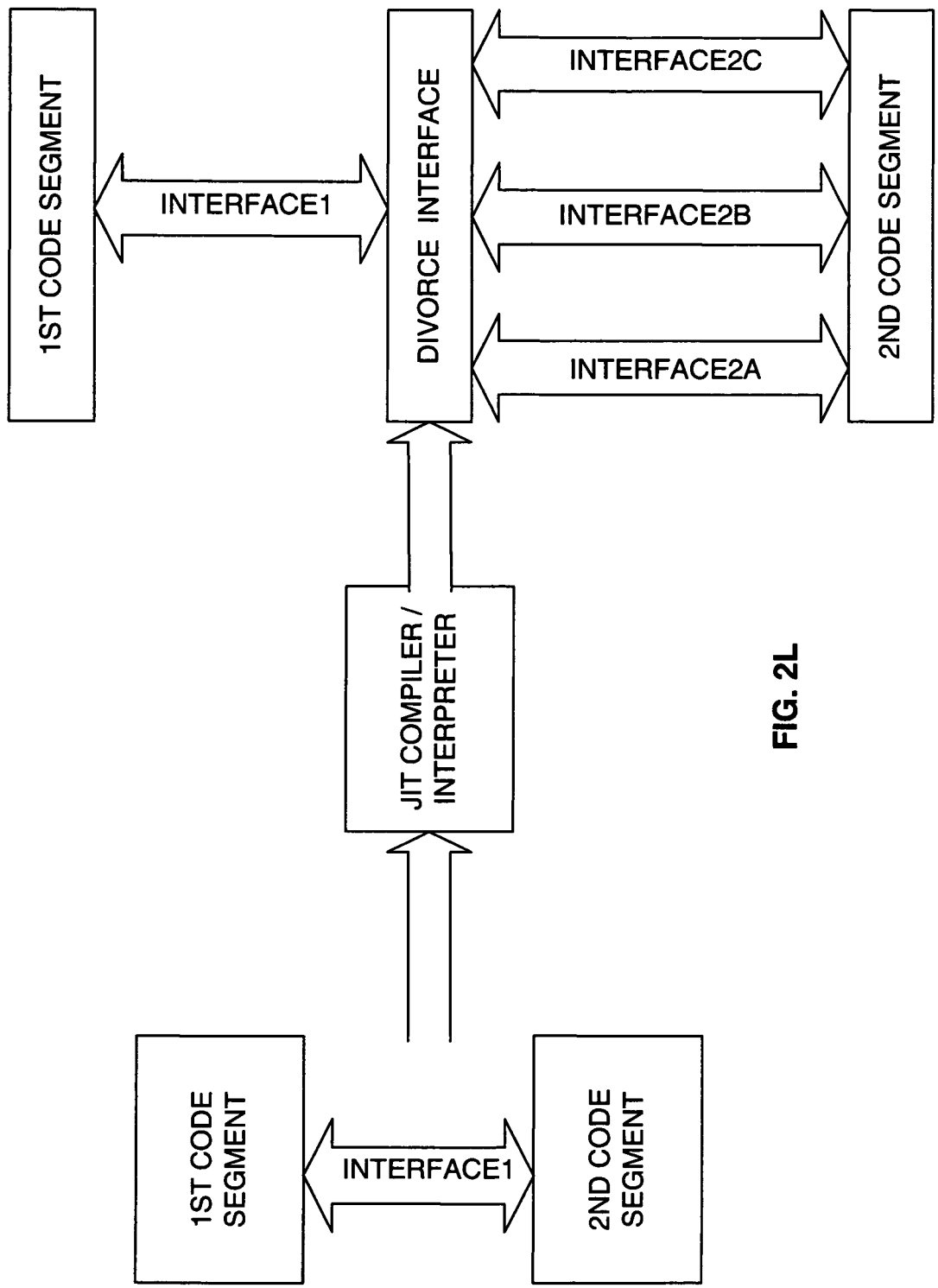
Figure 2M:
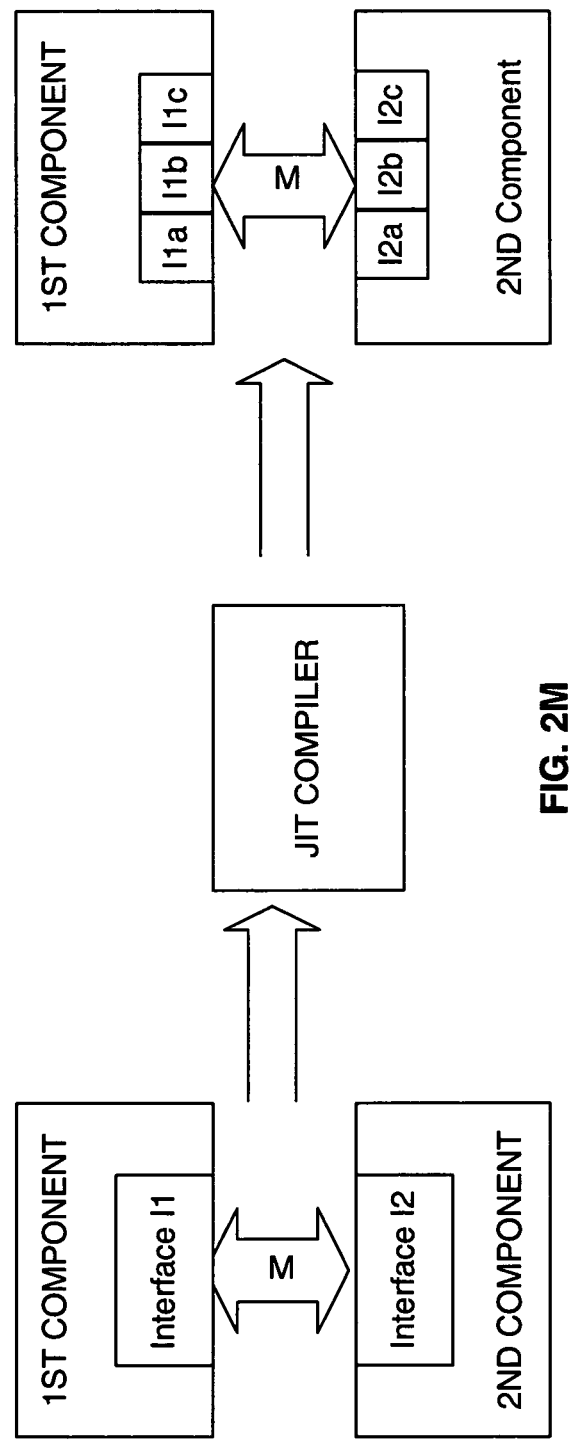

A communication from one code segment to another may be accomplished indirectly by breaking the communication into multiple discrete communications. This is depicted schematically in FIGS. 2J and 2K. As shown in FIG. 2J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 2K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 2C to a new operating system, while providing the same or similar functional result.

Figure 1:
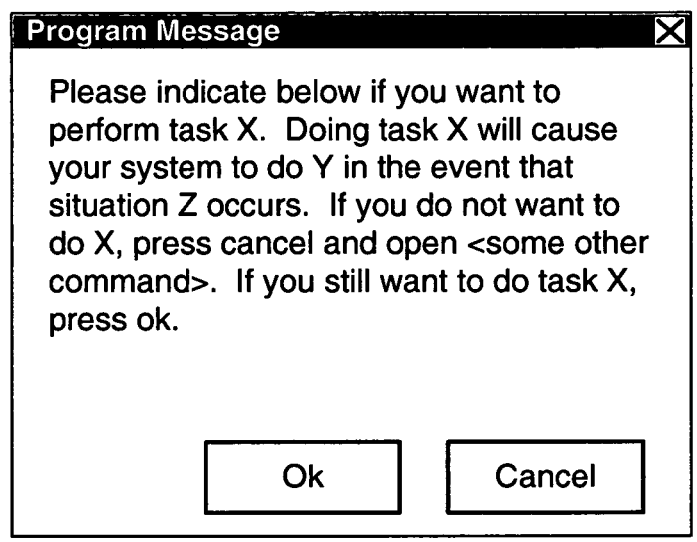
FIG. 1 is an illustration of a prior art message box type of dialog user interface.

Rewriting. Yet another possible variant is to dynamically rewrite code to replace the interface functionality with something else but which achieves the same overall result. For example, there may be a system in which a code segment presented in an intermediate language (e.g. MICROSOFT® IL, JAVA® ByteCode, etc.) is provided to a Just-in-Time (JIT) compiler or interpreter in an execution environment (such as that provided by the MICROSOFT® .NET FRAMEWORK®, the JAVA® runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface) protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2B and 2C. It is also noted that, as with most programming constructs, there are other similar ways of achieving the same or similar functionality of an interface which may not be described herein, but nonetheless are represented by the spirit and scope of the invention.

III. Task Dialogs

As used herein, a "task dialog" is a specialized type of dialog employed when a decision or other information is needed from a user in order to continue a specific task. In at least some embodiments, a task dialog is limited to receiving input to and/or providing information regarding a single task or event. Task dialogs include message boxes and confirmation dialogs, as well as dialogs asking a user for information in order to complete a particular command or instruction. FIGS. 3A-3J show examples of task dialogs according to at least some embodiments of the invention. Although the dialogs shown in FIGS. 3A-3J are all shown as independent windows in a GUI generated by an OS (such as various versions of the WINDOWS OS), the invention is not limited in this regard. For example, task dialogs according to the invention might also be generated as a pane of (or frame within) a pre-existing window.

Figure 3A:
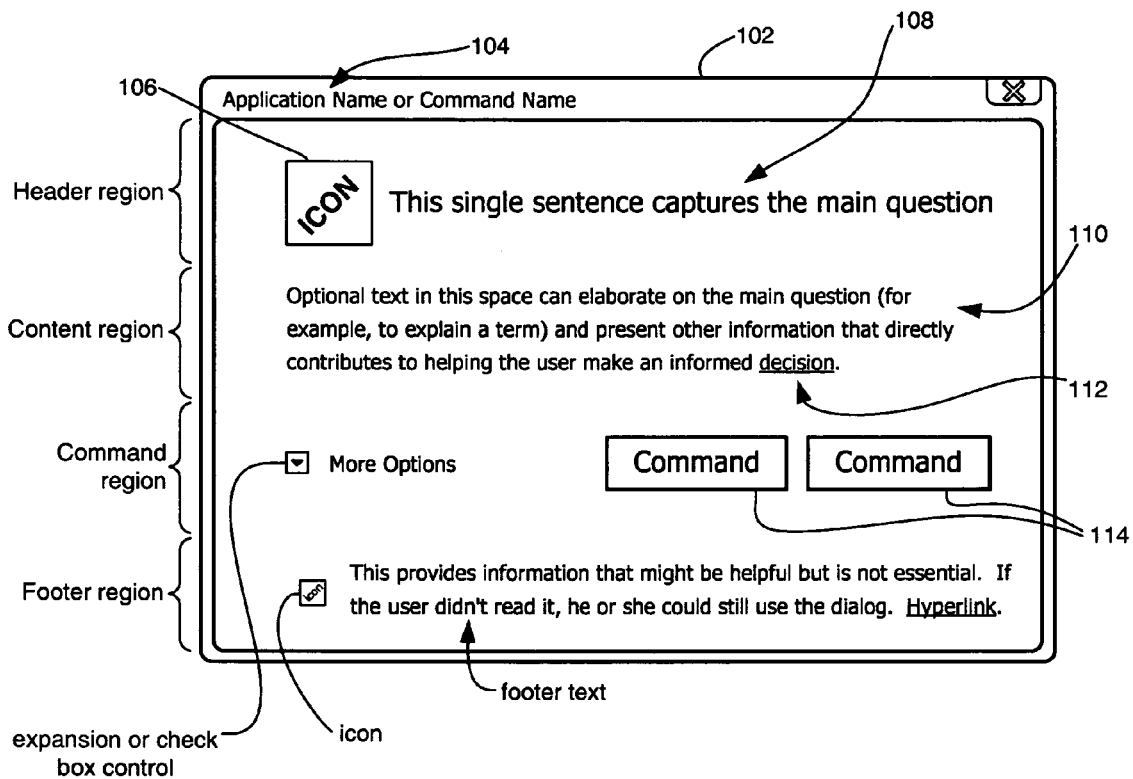

Shown in FIG. 3A is a generic task dialog 102 according to at least some embodiments of the invention. Task dialog 102 is divided into header, content, command and footer regions. Each of these regions is described in more detail below. Task dialog 102 also includes a window title 104. In at least some embodiments, window title 104 is the name of the program (or command in an application program) which caused task dialog 102 to be generated. Not all of the regions shown in FIG. 3A are required in every task dialog. For example, the content and footer regions are optional in at least some embodiments. Text within some or all of the regions can also be accessible as text. For example, a user might wish to copy text from one of the regions and paste that text elsewhere.

The header region of task dialog 102 is displayed prominently and informs the user of the purpose of the task dialog. In this manner, the user can readily determine the type of information being provided and/or being sought. The header region of task dialog 102 contains a main instruction 108 and a main icon 106. For simplicity, icons are shown generically in the drawings as the word "icon" inside a box. Although optional, main icon 106 is often useful for providing the user with a rapidly-understood visual clue to the purpose of the task dialog. For example, standardized icons can be specified by a developer for error messages (e.g., a red circle with an "x"), for warning messages (e.g., a yellow triangle with an exclamation mark "!") and for informational messages (e.g., an "i" inside of a balloon). Of course, a developer could specify other icons. As but one example, an icon corresponding to the program causing a task dialog to be created can be used as a main icon 106. Main instruction 108 is a text string specified by a developer, and is preferably a concise sentence or question directed to, and easily understood by, a computer user. In at least some embodiments, a main instruction is required (i.e., a developer must specify a main instruction when creating a task dialog).

Immediately below the header region is a content region. Within the content region, the developer can place additional text 110. Text within the content region can also contain one or more hyperlinks 112, selection of which may open a new window, another program, a link to an Internet resource, etc. For convenience, hyperlinks are represented in the drawings with underlining. In at least some embodiments, and as explained in more detail below, text 110 within the content region is automatically made smaller in size than text 108 in the header region. In this manner, text 110 does not distract the user from a primary message being conveyed by header region text 108. The developer can, for example, use the content region for longer portions of text that might be needed to explain additional details regarding the primary message in the header region. If a developer attempts to place more text within a content region than can be displayed, a scrolling text box is automatically generated in the content region (not shown). If the content region is too small to effectively include a scrolling text box, the entire task dialog is displayed in a scrolling window (also not shown). In at least some embodiments, a content region is optional, i.e., a developer need not include content text in a task dialog.

Beneath the content region is the command region. Placed within the command region are one or more UI controls with which a user can provide a response to the task dialog. As used herein, "UI control" includes various types of graphical elements which a user can select (by, e.g., hovering a cursor over the control and pressing a mouse button) so as to interact with the computer program that caused the task dialog to be created. For example, a UI control may allow a user to respond to a question, initiate an action, display additional information, etc. UI controls include, but are not limited to, buttons, "radio" buttons, check boxes, text input boxes, expansion controls (described below), etc. Controls within the command area can include buttons having responses from a predefined collection (e.g., buttons for "yes," "no," "ok," "cancel," etc.), buttons with specialized commands specified by a program requesting the task dialog (e.g., "save," "delete," "disconnect," "connect," etc.) or combinations of both standard and specialized buttons or other controls. A developer can also specify which of the controls in the command area is the default choice, i.e., the choice which is automatically highlighted for selection by the user. As described in more detail below, the sizing and arrangement of controls within the command region is also automatic. In FIG. 3A, the command region includes two buttons 114 (generically labeled "Command"), an expansion control and text ("More Options") accompanying the expansion control. Upon selection of an expansion control by the user, and as explained in connection with subsequent drawings, additional text is displayed. In at least some embodiments, expansion controls are optional. If used, however, expansion controls are automatically placed in the command region. In certain embodiments, a developer can specify the text to be placed next to the expansion control glyph in the expanded and collapsed conditions, but cannot modify the glyph.

Beneath the command region is the footer region. In at least some embodiments, the footer region is limited to text (with or without hyperlinks) and an icon. In at least some embodiments, the footer region icon may be the same as or different than the main icon. A footer region icon (or the entire footer region) may be omitted at the developer's option. The footer text, which is preferably limited to information which might be helpful to the user but which is not essential for use of the task dialog, is automatically sized and arranged.

Figure 3B:
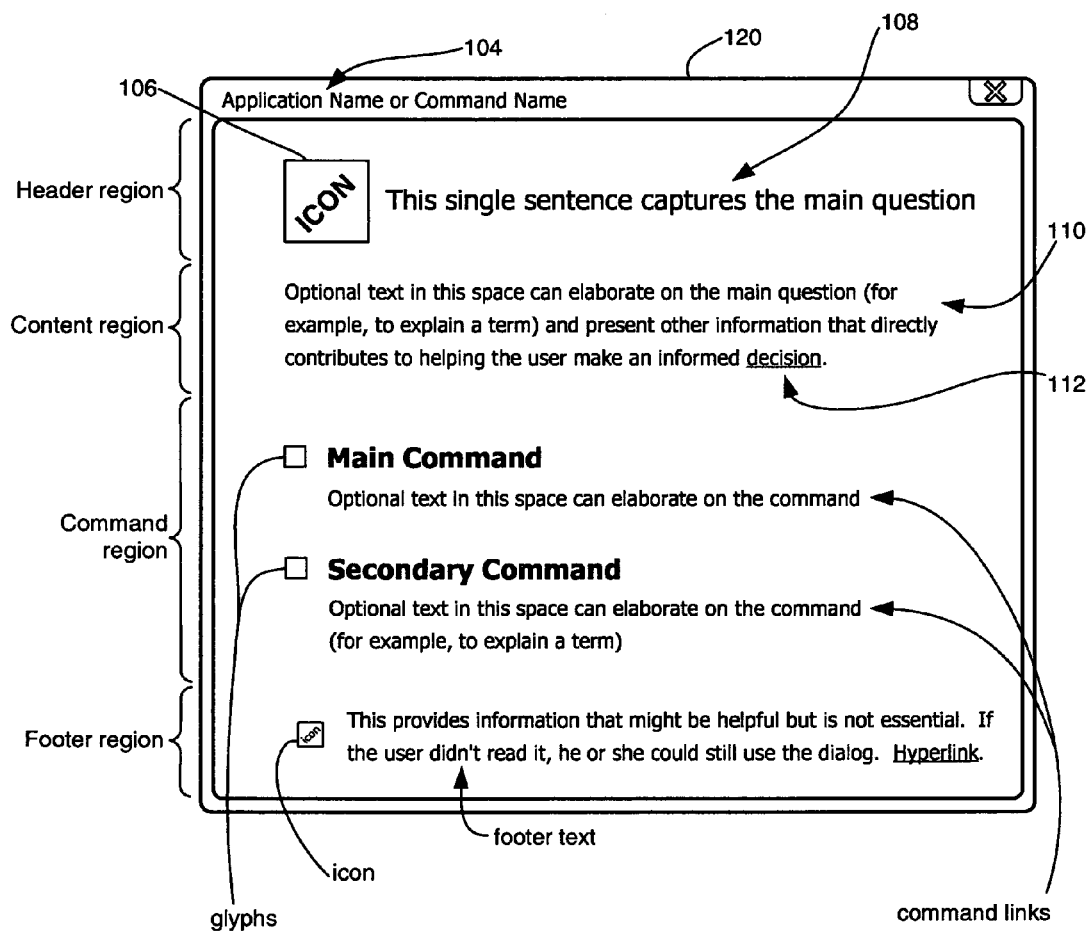

FIG. 3B is another example of a generic task dialog 120. Task dialog 120 is generally similar to task dialog 102, but includes command link controls instead of command buttons. Command link controls are described in commonly owned U.S. patent application Ser. No. 11/106,723, titled "Command Links" and incorporated by reference herein. In at least some embodiments, a task dialog must either have one or more command links or one or more command buttons, but cannot have both command links and command buttons. In other embodiments, both command links and command buttons can be contained in a single task dialog. In certain embodiments, command region backgrounds for task dialogs having command links are rendered differently than command region backgrounds for task dialogs having command buttons.

Figure 3C:
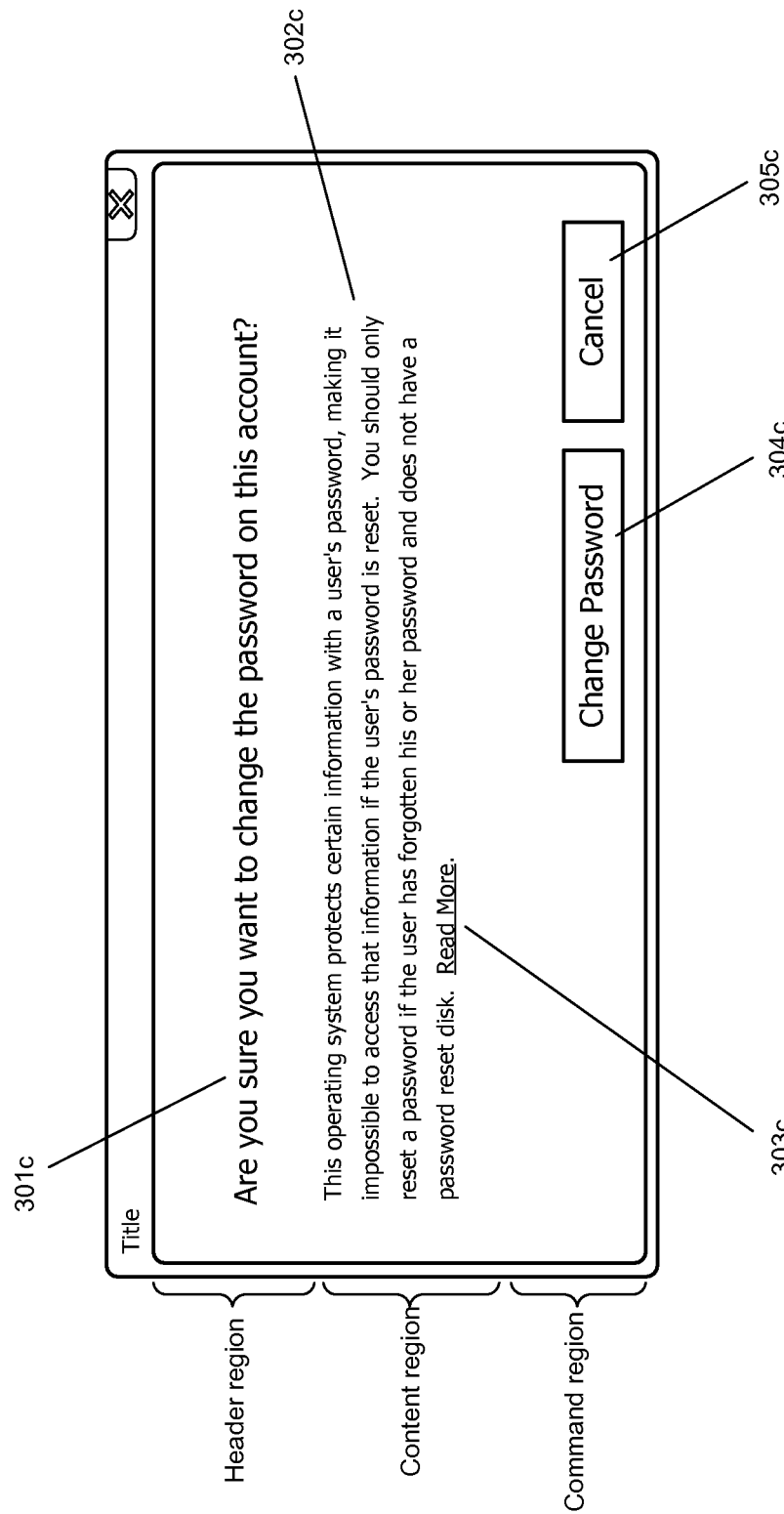

FIGS. 3C through 3J provide more specific examples of possible task dialogs, and illustrate some of the many combinations of elements that may be contained within a task dialog. FIG. 3C is an example of a task dialog having a main instruction 301c and no icon in the header region, text 302c with a hyperlink 303c in the content region, two controls ("Change Password" 304c and "Cancel" 305c buttons) in the command region, and no footer region. A user can quickly discern the task dialog's purpose from the main instruction 301c (asking if the user wants to change an account password). The user can obtain additional information from the explanatory text 302c in the content region and has the opportunity to gather even more information via the hyperlink 303c ("Read More"). However, the main instruction 301c and the content region text 302c are automatically sized and placed so that the purpose of the task dialog is not obscured by the additional explanatory text.

Figure 3D:
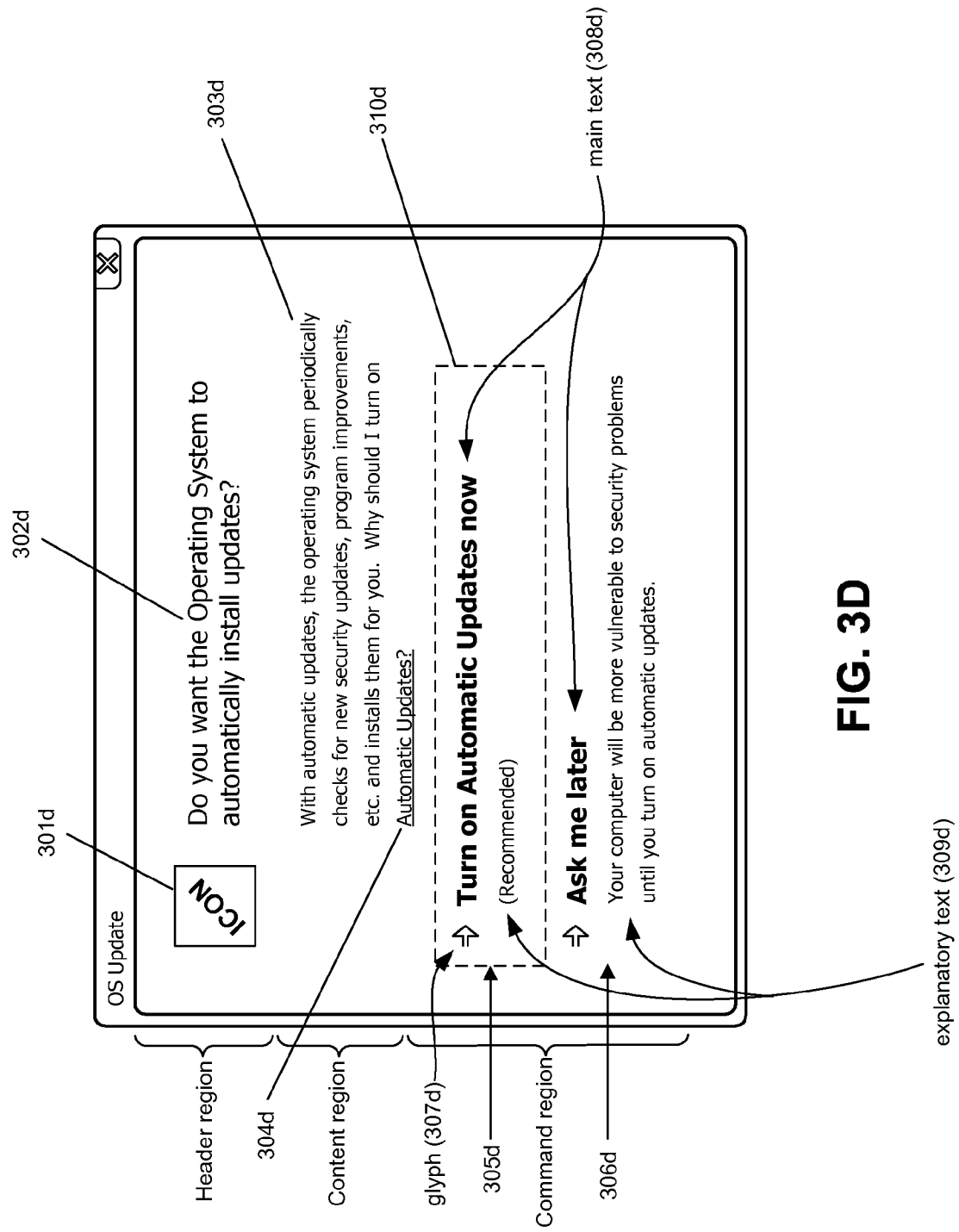
Figure 3E:
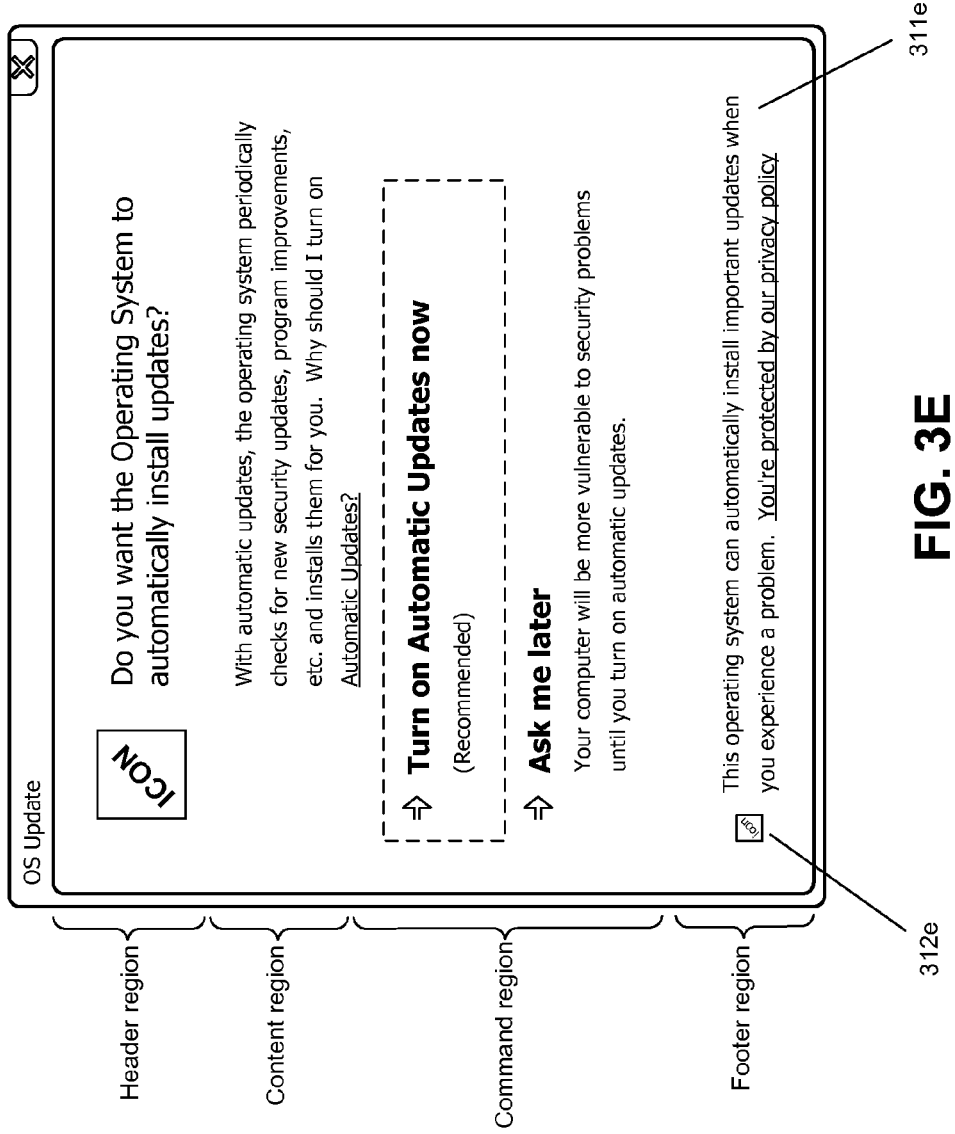

FIG. 3D is an example of a task dialog having a main icon 301d and main instruction 302d in the header region, text 303d with a hyperlink 304d in the content region, command links 305d-306d in the command region, and no footer region. As described more fully in the previously incorporated U.S. patent application, each command link includes a glyph 307d (a small arrow in FIG. 3D), a main text portion 308d, and an explanatory text portion 309d. When the user hovers a cursor over one of the command links, the entire command link is highlighted with, e.g., an outline 310d. In the example of FIG. 3D, the "Turn on Automatic Updates now" command link 305d is highlighted. When the command link 305d is selected (by, e.g., pressing a mouse button), a response as indicated by the main text portion 308d of the command link is initiated. FIG. 3E is an example of a task dialog which is similar to that of FIG. 3D, but which also includes a footer region having footnote text 311e and a footer icon 312e.

Figure 3F:
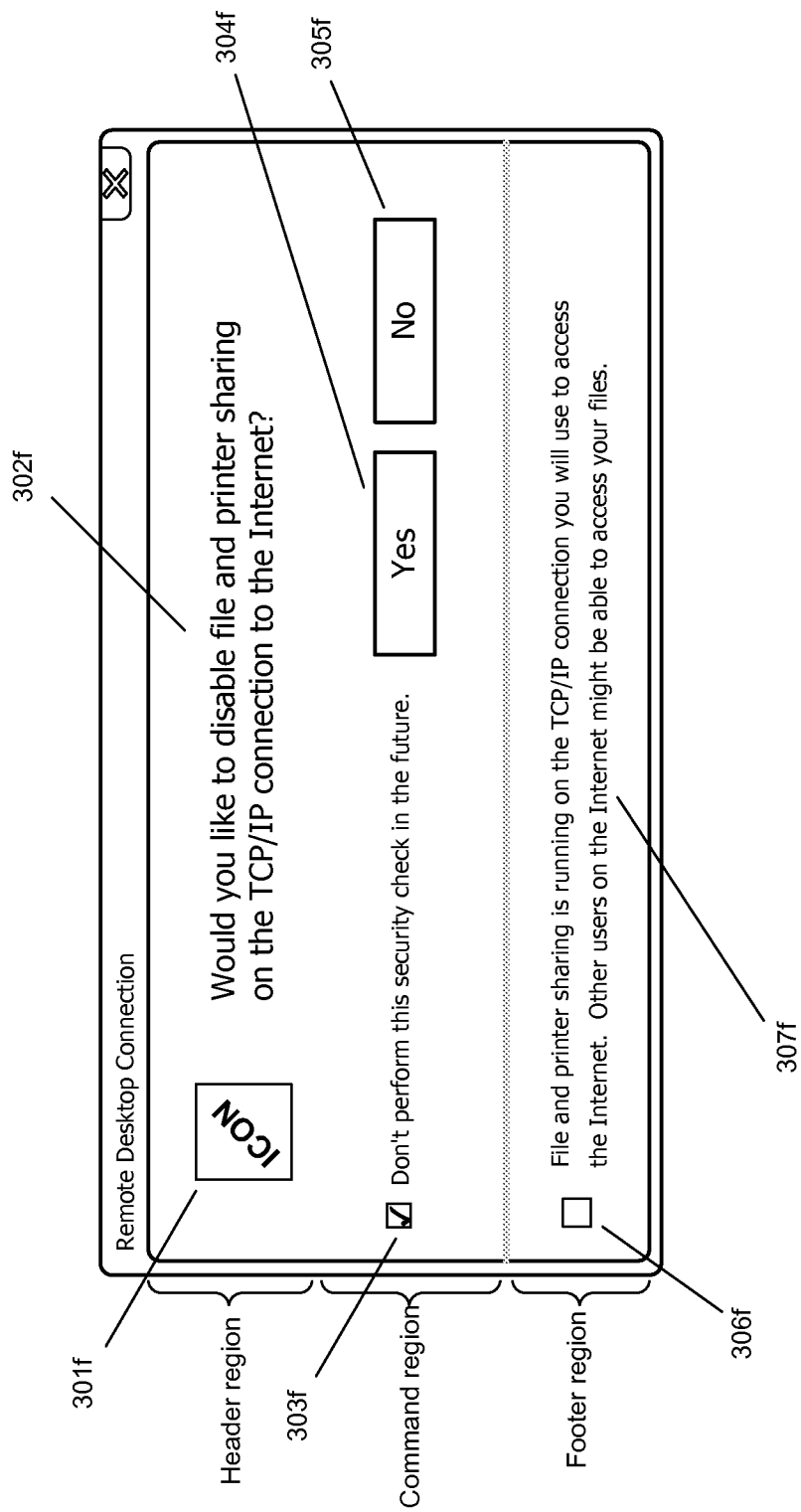

FIG. 3F is an example of a task dialog having a main icon 301f and a main instruction 302f in the header region and no content region. The task dialog of FIG. 3F includes a verification (or "check box") control 303f, as well as buttons corresponding to "Yes" and "No" responses 304f and 305f. When the user dismisses the task dialog (whether by selecting one of the Yes or No command buttons 304f of 305f or by clicking on the "X" in the upper left corner), the state of the verification control is returned to the program which caused generation of the task dialog. In at least some embodiments, for task dialogs having command links instead of buttons, verification and expansion controls are automatically placed in a portion of the command region below the command links so as not to distract the user from the command links. The task dialog of FIG. 3F further includes an icon 306f and a footnote 307f in the footer region.

Figure 3G:
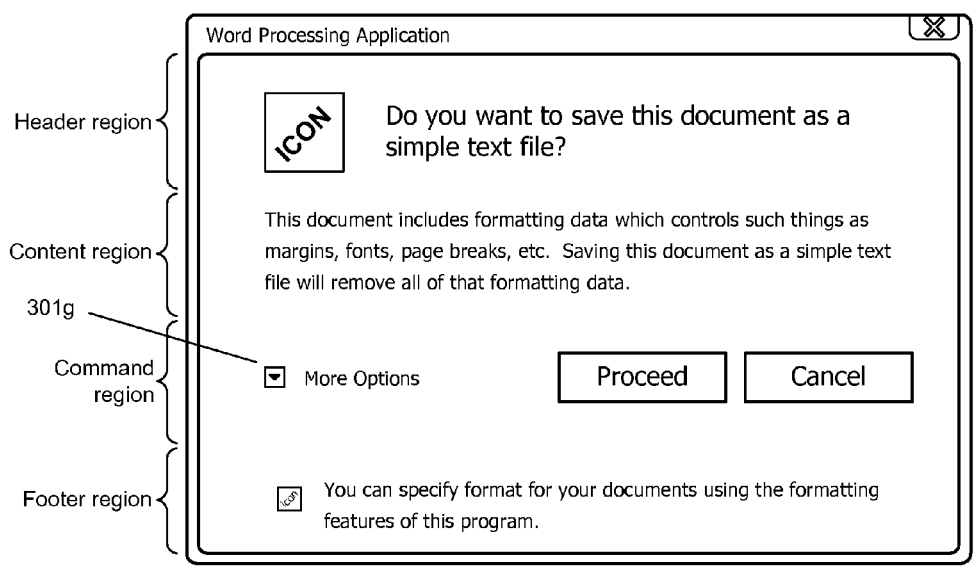
Figure 3H:
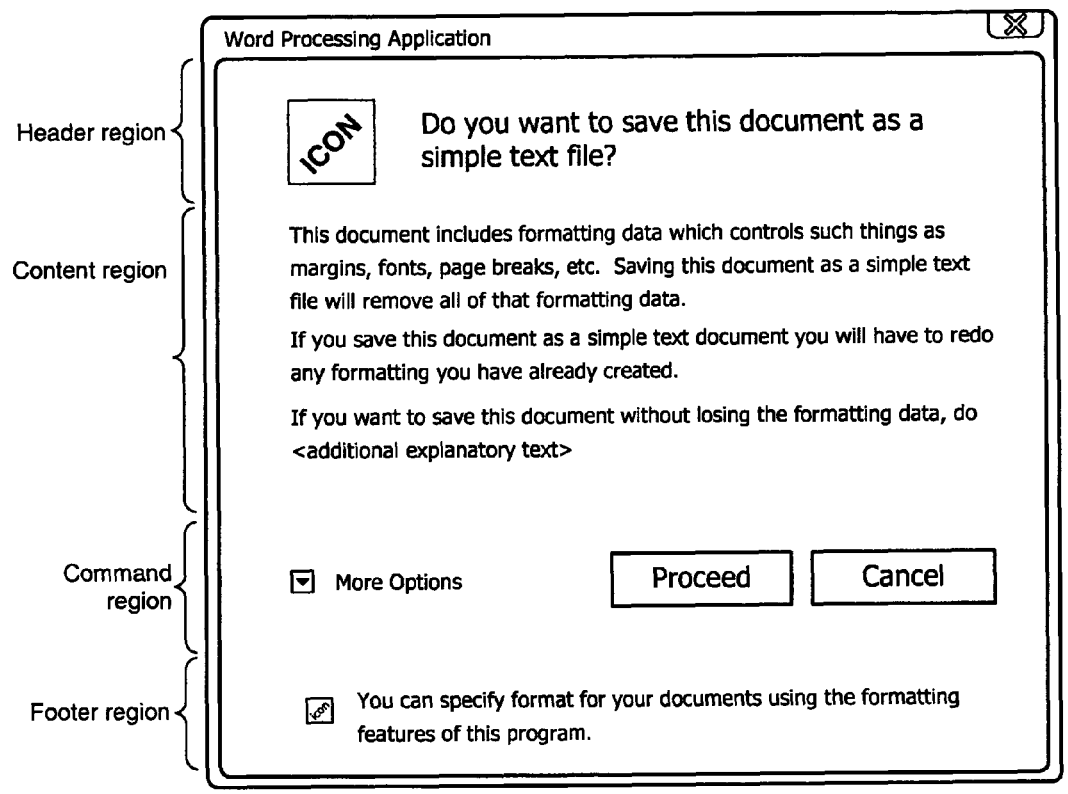
Figure 31:
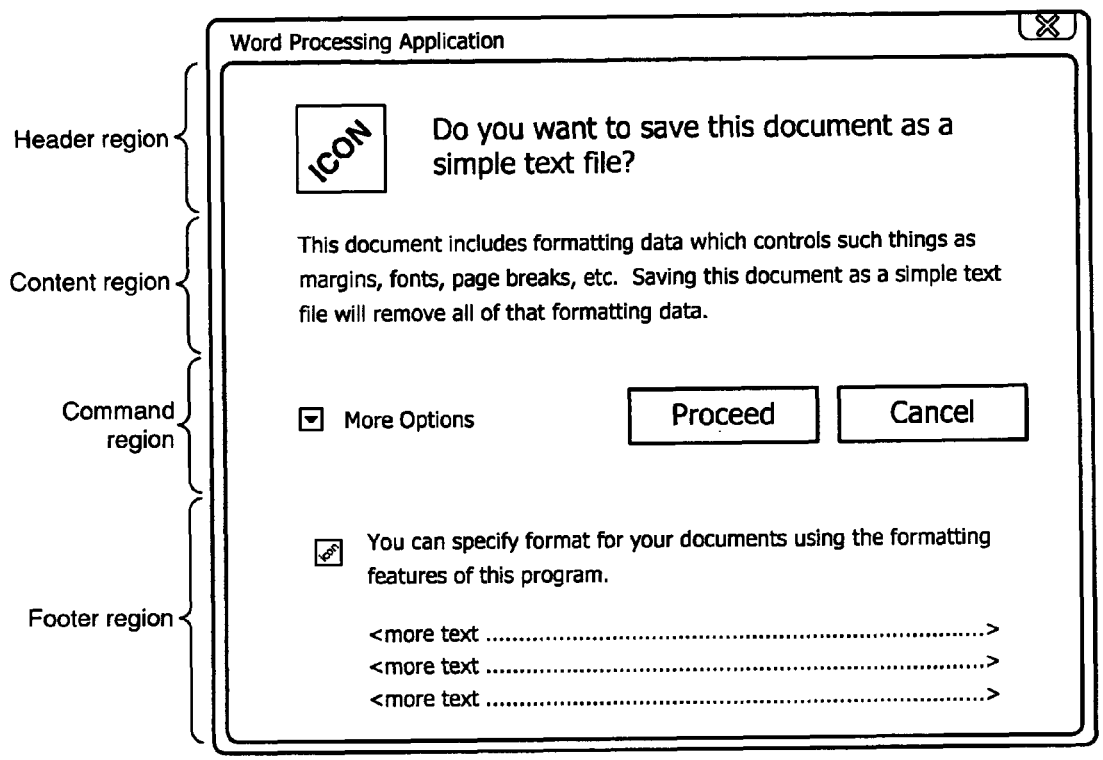

FIG. 3G is an example of a task dialog having an expansion control 301g in the command region. Upon selection of the expansion control 301g by the user, either the content region or footer region is expanded to provide additional information. FIG. 3H shows an example in which the content region has expanded. FIG. 3I shows an alternate example in which the footer region has expanded. In at least some embodiments, an expansion control will allow expansion of the footer region or of the content region, but not of both regions.

Figure 3J:
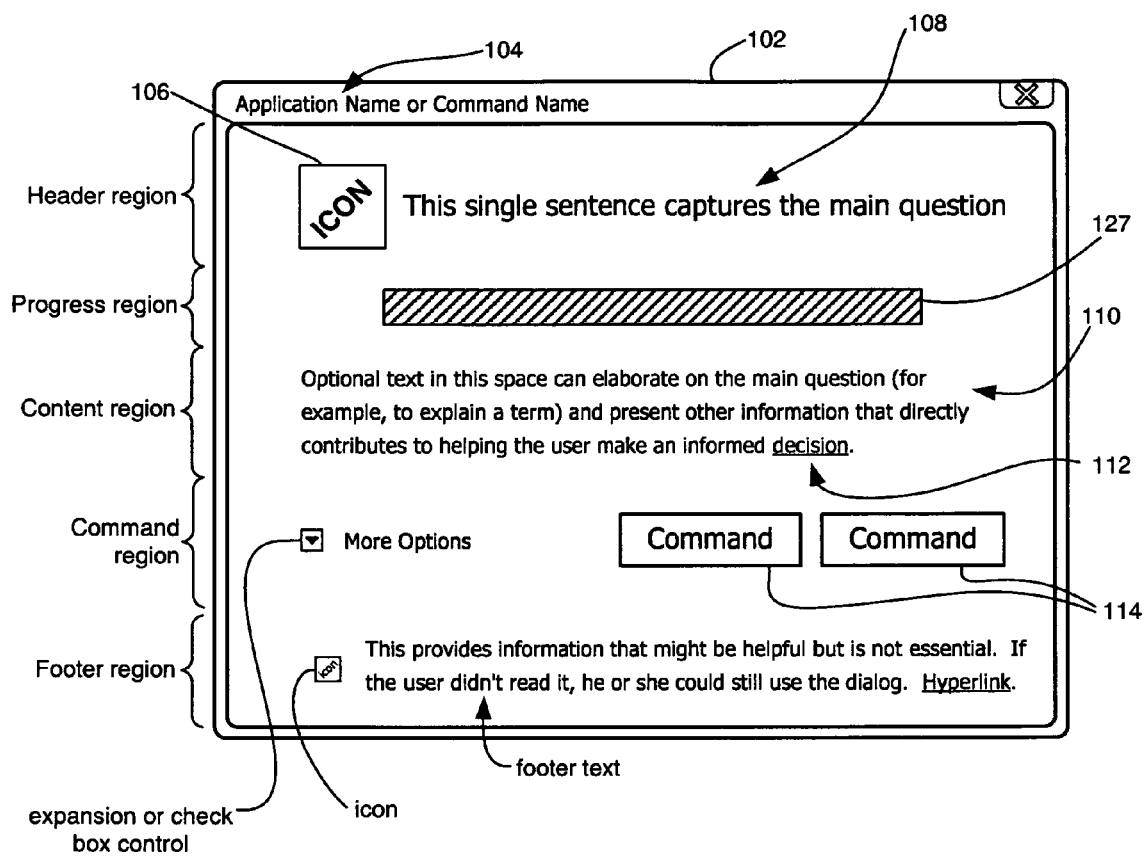

In at least some embodiments, a task dialog may optionally include a progress region located between the header and content regions. The progress region can be used to provide an informational UI control that informs the user how much of a particular process being performed by the computer (e.g., downloading a file, converting a file to another format, performing a scan of files for viruses, etc.) has been completed. Examples of such informational UI controls include a "thermometer" bar which indicates the percentage of task completion. FIG. 3J is an example of a task dialog as shown in FIG. 3A, but which includes a progress region having a progress-indicating informational UI control 127. A progress region (and associated informational UI control) could be included in various combinations with other task dialog formats and elements described herein.

Figure 4:
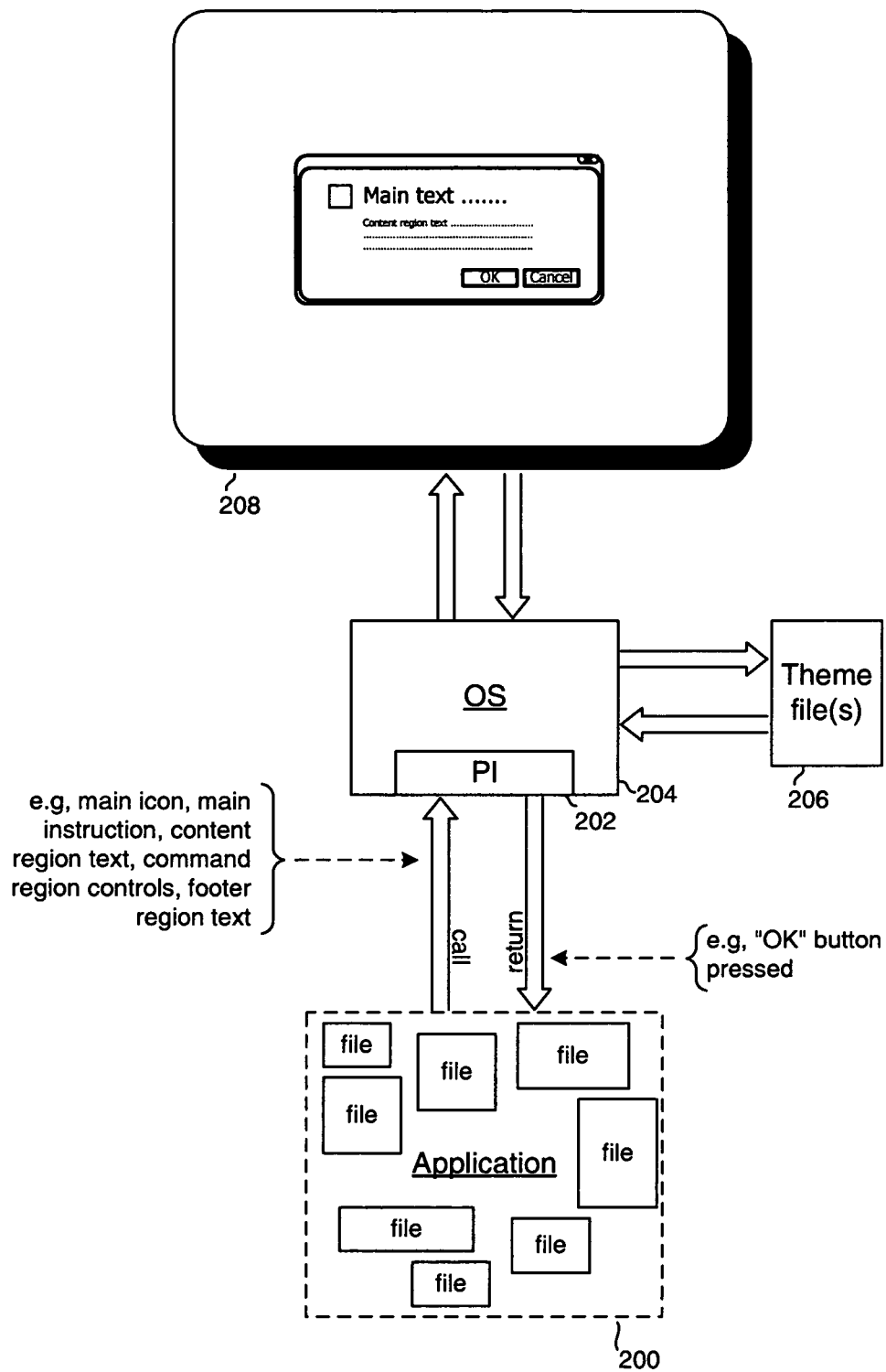
FIG. 4 is a block diagram showing generation of a task dialog in response to a request from an application program.

FIG. 4 shows, in diagrammatic form, how an application program can cause an OS to create a task dialog according to at least some embodiments. Shown at the bottom of FIG. 4 is a block representing an arbitrary application program 200. Because application programs typically include a plurality of separate program files and other components, application program 200 is shown in FIG. 4 as a broken line box surrounding multiple solid line boxes, with each of the solid line boxes representing separate files. More than one of those individual files may be able to request creation of a task dialog, and such a request may include pointers or other references to data within other files of application program 200.

Application 200 requests generation of a task dialog by transmitting that request to programming interface (PI) 202. Although shown in FIG. 4 as a part of OS 204, PI 202 can be implemented in various of the manners described in connection with FIGS. 2B through 2M. PI 202 includes one or more functions or methods which application 200 accesses through one or more calls. Included in the call are parameters, flags and other elements providing the information (or pointers to the information) which OS 204 will use to generate a task dialog. Included at the end of this detailed description are Appendices A though R describing functions and structures, according to at least some embodiments, by which application 200 may access PI 202. Because Appendices A through R will be readily understood by persons skilled in the art, they will not be extensively discussed herein. In general however, the information provided by application program 200 may include at least some or all of the following:

title for the task dialog window
    if the task dialog should contain a main icon
    if a main icon is to be displayed, the identity of that icon
    the main instruction
    if the task dialog should include a progress region
    if the task dialog should include a content region
    if a content region is included, the text for that content
    the buttons to be included in the command region
    if the buttons in the command region should be displayed
        as command links
    if there should be a verification check box in the command
        region if there should be an expansion control in the command region, and if so, the text for the expansion control if an expansion control is to be included, whether the content region or footer region should be expandable/collapsible if the task dialog should contain a footer region if the task dialog is to contain a footer, the text for that footer if hyperlinks in content or footer text should be enabled where data identifying a pushed button should be stored The information set forth above may be provided directly (i.e., as a value passed as part of the function call), indirectly (i.e., as a pointer to a variable, structure or other object), or both.

Using information received by PI 202 from application program 200, OS 204 automatically generates a task dialog so that the main instruction will be prominently displayed, so that the content region (if the task dialog is to have a content region) will be located under the main instruction and in smaller text, so that the command region will be located under the header and/or content region(s), etc. OS 204 automatically sizes command buttons (if used) to be large enough for the specified button text. OS 204 automatically places expansion controls (if used) and verification controls (if used) in the proper location(s) relative to command buttons or command links.

As seen in the attached Appendices A through R, application 200 is not required to include extensive layout and other formatting data in the function call. Instead, OS 204 accesses one or more theme files containing data that specifies how various components of all task dialogs (whether called by application 200, by other programs, or by OS 204 itself) are to be displayed. In this manner, all task dialogs may have a consistent layout, thereby enhancing the efficiency with which a user can interface with those task dialogs. Table 1 sets forth examples of task dialog components that may be controlled by reference to one or more theme files.

TABLE 1

| Component | Value Type | Description |
| --- | --- | --- |
| Main Instruction Icon Padding | Margin | Top & Left Margin of the Main Instruction Icon |
| Header Padding | Margin | Padding between the Header & Content Area |
| Content Area Padding | Margin | Content Area padding for left, right, and bottom |
| Command Area Padding | Margin | Command Area padding for the left, right and bottom |
| Footnote Icon Padding | Margin | Top & Left Margin of the Footnote Icon Padding |
| Command Link Area Padding | Margin | Padding for left, right, bottom for each command link specified in the Command Area |
| Main Instruction Style | Font | Font Style (size, color) of the Main Instruction text |
| Content Area Text Style | Font | Font Style (size, color) of the Content Area text |
| Command Area Options Text Style | Font | Font Style (size, color) of, e.g., the "More Options/Don't ask me again" text in the Command Area |
| Footnote Text Style | Font | Font Style (size, color) of the Footnote text |
| Header Background | Color | Background color of the Header |
| Content Area Background | Color | Background color of the Content Area |
| Command Area Background for Buttons | Color | Background color of the Command Area for Buttons |
| Command Area Background for Links | Color | Background color of the Command Area for Command Links |
| Footer Background | Color | Background color of the Footer |

Also included in theme file(s) 206 may be one or more styles for components of a task dialog. Set forth below in Table 2 are examples of possible style data.

TABLE 2

| Component | Style |
| --- | --- |
| Dialog Background Color | RGB (255, 255, 255) Hex #FFFFFF |
| Command Area Background Color | RGB (240, 240, 240) Hex #F0F0F0 |
| Main Instruction | Font: Segoe UI |
|  | Style: Regular |
|  | Size: 12pt (96 dpi) |
|  | Leading: 14pt |
|  | Anti-Alias: Crisp |
|  | Color: RGB (19, 112, 171) Hex #1370AB |
| Content Text/Expanded Content Text/More Options Text/Verification Text/Footer Text/Footer Expanded Text | Font: Segoe UI |
|  | Style: Regular |
|  | Size: 9pt (96 dpi) |
|  | Leading: 12pt |
|  | Anti-Alias: Crisp |
|  | Color: RGB (87, 87, 87) Hex # 575757 |
| Hyperlink Text | Font: Segoe UI |
|  | Style: Regular |
|  | Size: 9pt (96 dpi) |
|  | Leading: 12pt |
|  | Anti-Alias: Crisp |
|  | Color: RGB (0, 2, 98) Hex # 000262 |
| Button Text | Font: Segoe UI |
|  | Style: Regular |
|  | Size: 9pt (96 dpi) |
|  | Leading: 12pt |
|  | Anti-Alias: Crisp |
|  | Color: RGB (0, 2, 96) Hex # 000260 |
| Command Link Main Text | Font: Segoe UI |
|  | Style: Regular |
|  | Size: 12pt (96 dpi) |
|  | Leading: 14pt |
|  | Anti-Alias: Crisp |
|  | Color: RGB (0, 3, 143) Hex # 00038F |
| Command Link Supporting Text | Font: Segoe UI |
|  | Style: Regular |
|  | Size: 9pt (96 dpi) |
|  | Leading: 12pt |
|  | Anti-Alias: Crisp |
|  | Color: RGB (0, 2, 98) Hex # 000262 |

Based on the information passed by application 200 to PI 202 in a task dialog function call, and using data in theme file(s) 206, OS 204 generates the desired task dialog on display 208. When the user then selects a command button or other control displayed as part of the task dialog, OS 204 communicates data regarding that button or other control, via PI 202, to application 200. Application 200 then processes that data.

In some embodiments, a developer can specify the modality of a task dialog. In other words, the developer can include (as part of a function call or other type of PI) an indication of whether the user will be required to respond to the message box before continuing to work in the application which caused the task dialog to be created. In certain embodiments, the default modality will require the user to respond to the task dialog before further work in the application that caused the task dialog, but will allow the user to switch to other applications without responding to the task dialog. If the application causing the task dialog is currently running in several windows, the user might (depending on the hierarchy of those windows) be able to move to other windows. In some embodiments, child windows of the parent window causing the task dialog are disabled (until the user responds to the task dialog), but higher level windows and pop-up windows are not disabled.

In some embodiments, an application requesting a task dialog with a hyperlink in content or footer text must explicitly indicate whether hyperlinks are to be enabled.

In at least some embodiments, different levels of task dialog customization may be available. For example, a software company developing OS 204 might wish to allow its own internal developers to make more extensive changes to a task dialog, but may wish to limit the degree to which an external developer of an application program may customize a task dialog. There could be various reasons for such an approach. If the company developing OS 204 wishes to maintain a design philosophy that is consistent across multiple user interfaces (including task dialogs), that company may have more confidence that its internal developers will be careful about observing UI design guidelines. Conversely, the desire and/or capacity for external developers to follow those guidelines might be uncertain. Moreover, the OS manufacturer may wish to limit external developers' ability to customize task dialogs in order to ensure that future versions of OS 204 will be compatible with applications developed for earlier versions of OS 204.

Figure 5A:
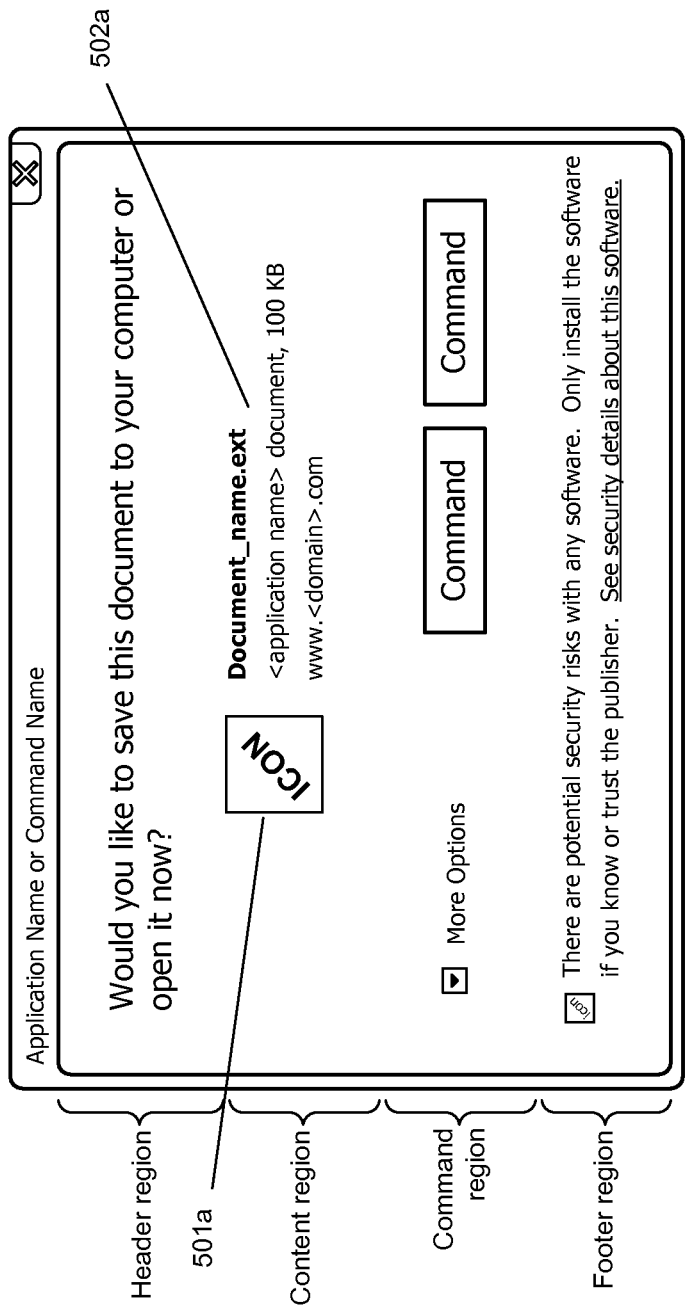
FIGS. 5A through 5F are examples of task dialog user interfaces according to additional embodiments of the invention.
Figure 5B:
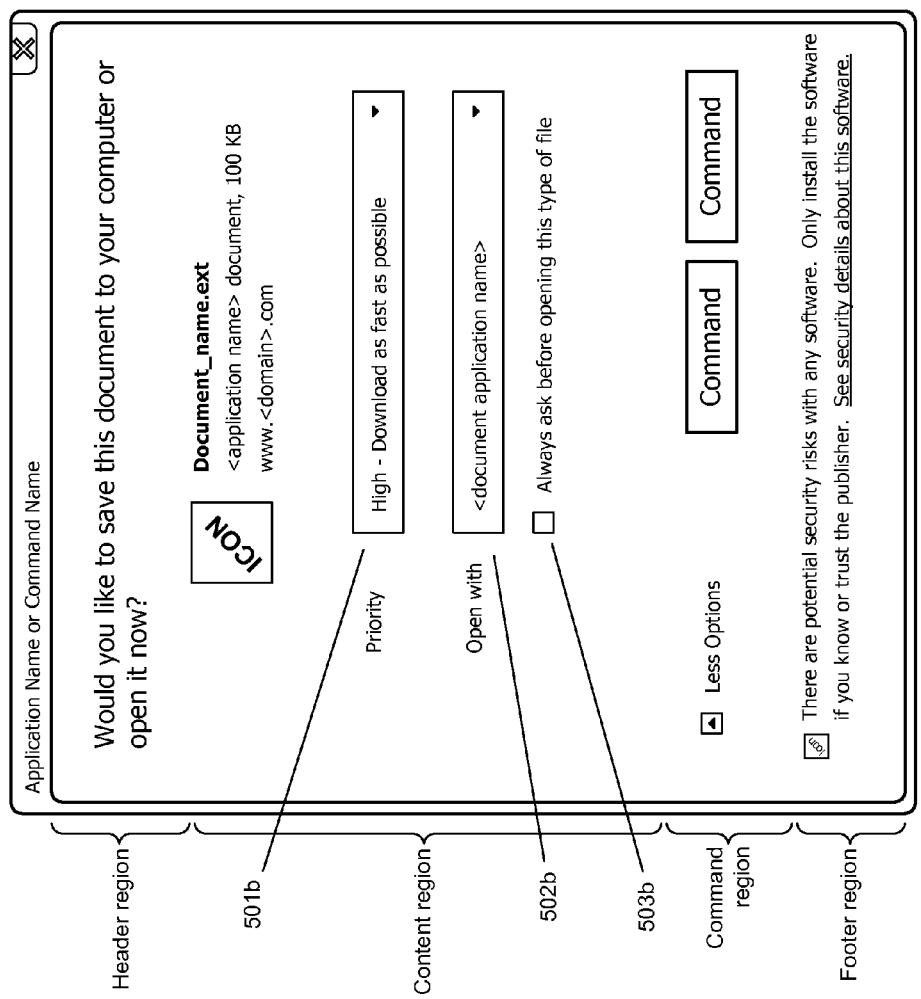
Figure 5C:
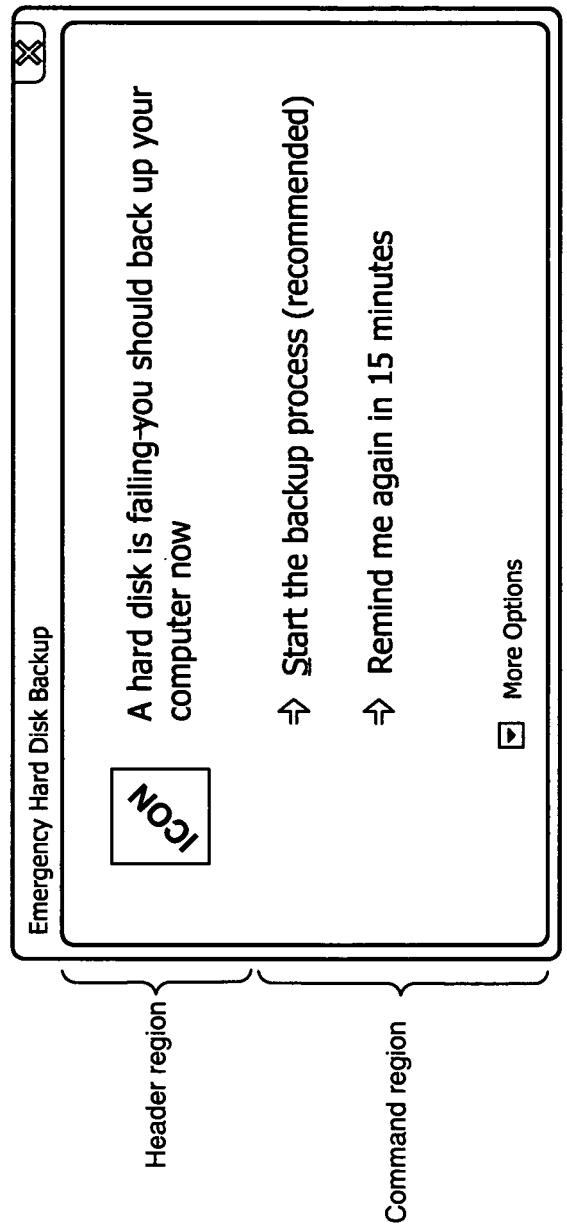
Figure 5D:
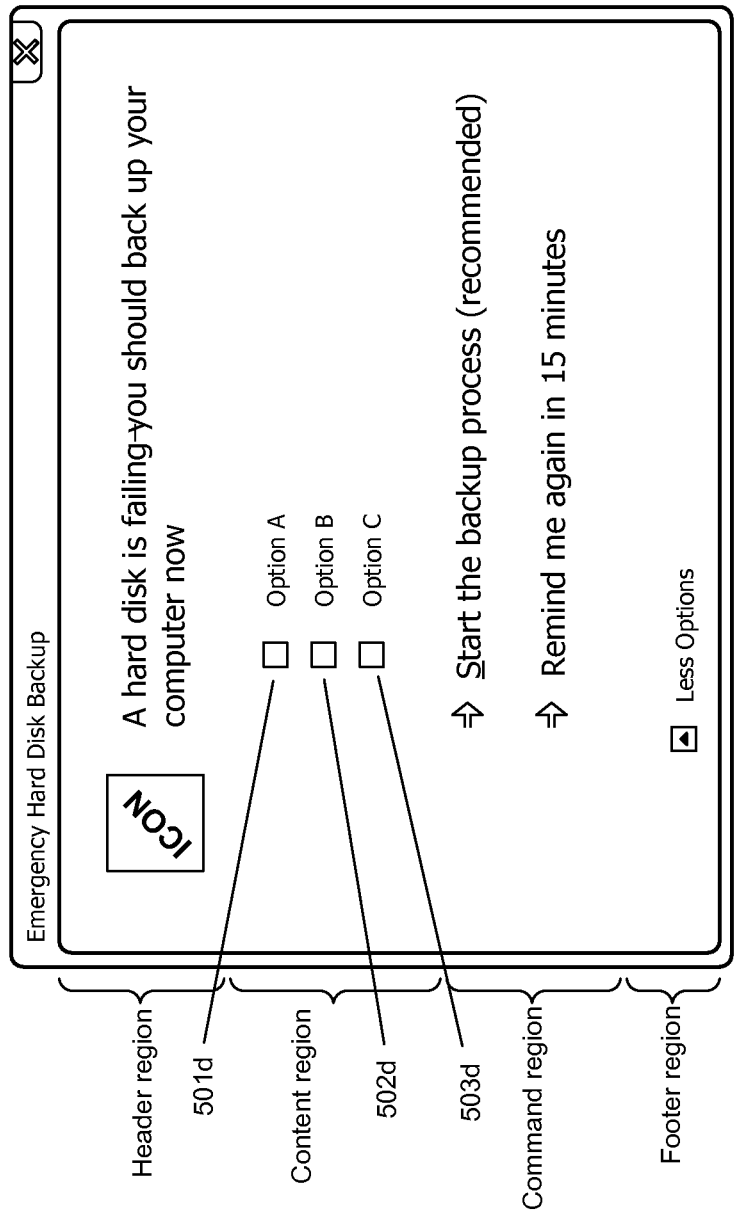
Figure 5E:
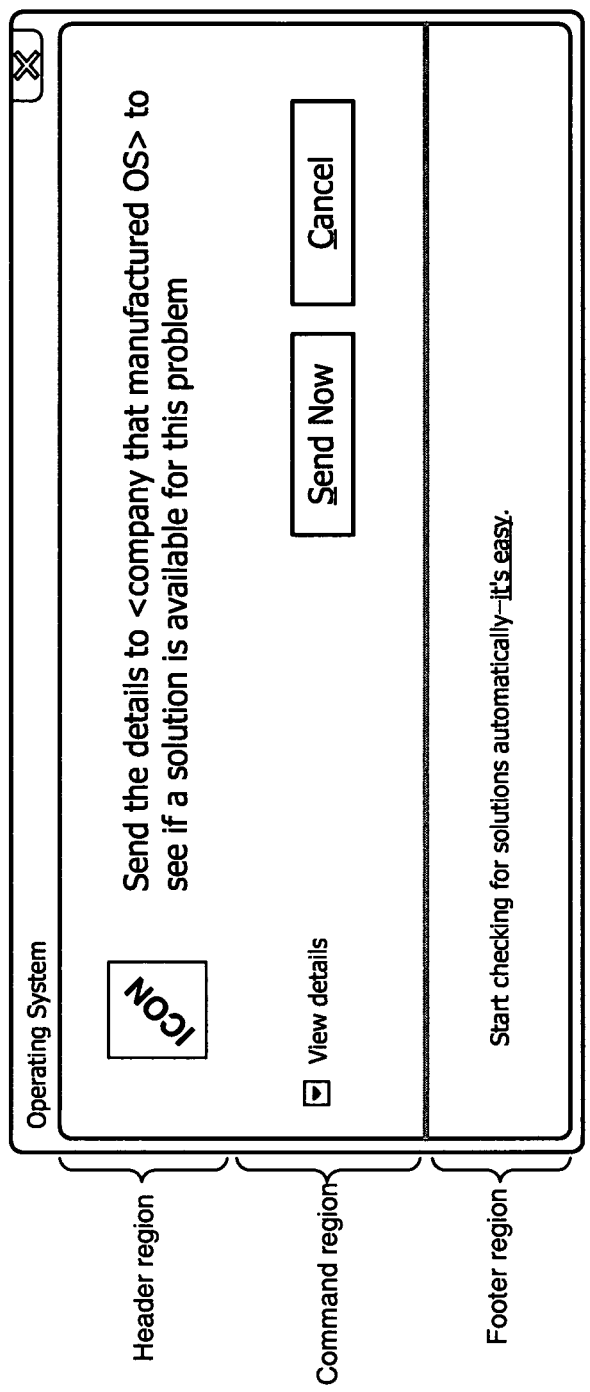
Figure 5F:
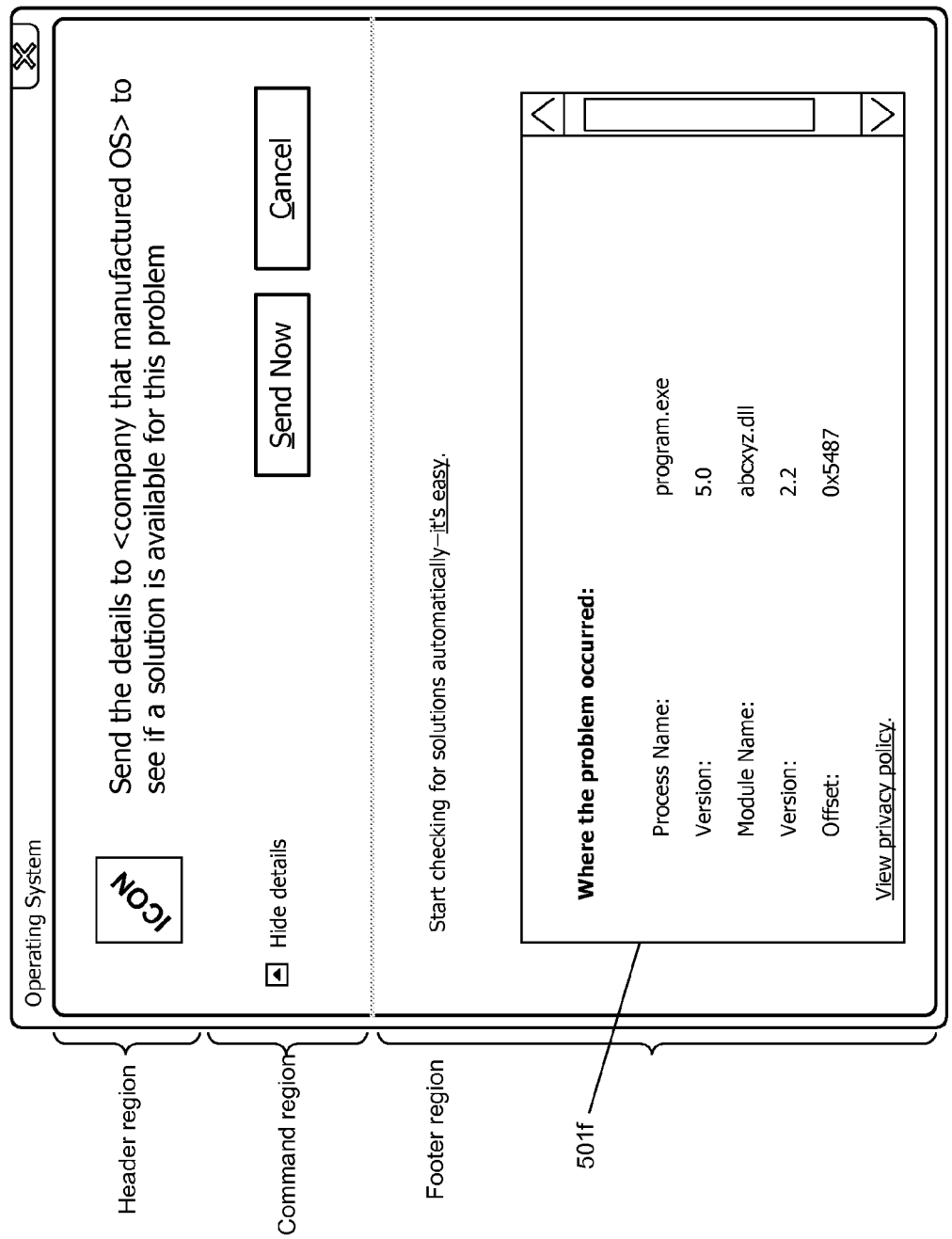

Shown in FIGS. 5A through 5F are examples of task dialogs that, according to at least embodiments, could be created by a developer of an OS that generates a task dialog, but which might not be available to external developers as part of an application PI for creating task dialogs. Shown in FIG. 5A is a task dialog with an icon 501a in an unexpanded content region. The content region of FIG. 5A also includes text of multiple styles 502a. FIG. 5B shows the task dialog of FIG. 5A in an expanded condition, and reveals additional UI controls 501b-503b placed in the content region. In the example of FIG. 5B, the content region includes buttons 501b-502b having drop down menus for selecting different download priorities and for selecting different applications with which to open a document, as well as a verification control 503b. FIG. 5C shows an unexpanded task dialog, which when expanded (FIG. 5D) also includes additional UI controls 501d-503d in the content region (verification controls for options A-C). FIG. 5E shows an unexpanded task dialog, which when expanded (FIG. 5F) includes scrolling, multi-style text 501f in the footer region.

Although specific examples of carrying out the invention have been described, those skilled in the art will appreciate that there are numerous other variations and permutations of the above described systems and techniques. As but one example, multiple hyperlinks can be included in content region text and/or in footer region text. An operating system may also generate task dialogs. These and other variations fall within the spirit and scope of the invention as set forth in the appended claims. As used in the claims, the phrase "data indicative of" includes pointers or other references to data located elsewhere, as well as the actual data itself. In the claims, various portions are prefaced with letter or number references for convenience. However, use of such references does not imply a temporal relationship not otherwise required by the language of the claims.

APPENDIX A

TaskDialog Function

The TaskDialog function creates, displays, and operates a task dialog. The task dialog contains application-defined message text and title, any icon, and any combination of predefined push buttons.

Syntax

```
HRESULT TaskDialog(
    HWND hwndParent,
    HINSTANCE hInstance,
    PCWSTR pszWindowTitle,
    PCWSTR pszMainInstruction,
    DWORD dwCommonButtons,
    PCWSTR pszIcon,
    int *pnButton
);
```

Parameters hWndParent

[in] Handle to the owner window of the task dialog to be created. If this parameter is NULL, the task dialog has no owner window.

hInstance

[in] Handle to the module that contains the icon resource identified by the pszIcon member, and the string resource identified by the pszWindowTitle or pszMainInstruction member. If this parameter is NULL, the pszIcon parameter must be null or use a predefined icon value (e.g., TD_ERROR_ICON) and the pszWindowTitle and pszMainInstruction must be NULL or point to actual null-terminated strings.

lpWindowTitle

[in] Pointer that references the string to be used for the dialog box title. This parameter can be either a null-terminated string or an integer resource identifier passed to the MAKEINTRESOURCE macro. If this parameter is NULL, the filename of the executable program is used.

lpMainInstruction

[in] Pointer that references the string to be used for the main instruction. This parameter can be either a null-terminated string or an integer resource identifier passed to the MAKEINTRESOURCE macro.

dwCommandButtons

[in] Specifies the push buttons displayed in the dialog box. This parameter may be a combination of flags from the following group.

TDCBF_OK_BUTTON

The task dialog contains the push button: OK

TDCBF_YES_BUTTON

The task dialog contains the push button: Yes.

TDCBF_NO_BUTTON

The task dialog contains the push button: No.

TDCBF_CANCEL_BUTTON

The task dialog contains the push button: Cancel. This button must be specified for the dialog box to respond to typical cancel actions: Alt-F4 and Escape;

TDCBF_RETRY_BUTTON

The task dialog contains the push button: Retry.

If no buttons are specified, the dialog box will contain the OK button by default.

pszIcon

[in] Pointer that references the icon to be displayed in the dialog box. This parameter must be an integer resource identifier passed to the MAKEINTRESOURCE macro or one of the following predefined values:

TD_ERROR_ICON

A stop-sign icon appears in the task dialog.

TD_WARNING_ICON

An exclamation-point icon appears in the dialog box.

TD_INFORMATION_ICON

An icon consisting of a lowercase letter i in a circle appears in the task dialog.

If this parameter is NULL no icon will be displayed. If the hInstance parameter is null and one of the predefined values is not used, no icon will be displayed.

pnButton

[out] Pointer to an integer location that receives one of the following values:

| | |
|---|---|
| 0 | Function call failed. Refer to return value for more information. |
| IDCANCEL | Cancel button was selected, Alt-f4 was pressed, Escape was pressed or the user clicked on the close window button |
| IDNO | No button was selected. |
| IDOK | OK button was selected. |
| IDRETRY | Retry button was selected. |
| IDYES | Yes button was selected. |

If this value is NULL, no value is returned.

Return Value

Returns S_OK if successful. If the operation fails, it returns an HRESULT which could be one of the following error codes.

| | |
|---|---|
| E_INVALIDARG | An invalid parameter was pass to the function. For example, a resource ID that does not exist in the module referred to by hInstance. |
| E_OUTOFMEMORY | The content of the dialog box was too big or complicated. |
| E_FAIL | An unexpected internal error was encountered. |

Remarks

When you use a task dialog box to indicate that the system is low on memory, the strings pointed to by the lpMainInstruction and lpWindowTitle parameters should not be taken from a resource file, because an attempt to load the resource may fail.

If you create a task dialog while a dialog box is present, use a handle to the dialog box as the hwndParent parameter. The hwndParent parameter should not identify a child window, such as a control in a dialog box.

Example

```
Int nButtonPressed    = 0;
TaskDialog(NULL, hInst, L"Title",
MAKEINTRESOURCE(IDS_DOSOMETHING),
    TDCBF_OK_BUTTON| TDCBF_CANCEL_BUTTON,
    TD_EXCLAMATION_ICON, &nButtonPressed);
if (IDOK == nButtonPressed)
{
    // ok pressed
}
    else if (IDCANCEL == nButtonPressed)
{
    // cancelled pressed
}
```

APPENDIX B

TaskDialogIndirect Function

The TaskDialogIndirect function creates, displays, and operates a task dialog. The task dialog contains application-defined messages, title, verification check box, command links and push buttons, plus any combination of predefined icons and push buttons.

Syntax

```
HRESULT TaskDialogIndirect(
    const TASKDIALOGCONFIG *pTaskConfig,
    int *pnButton,
    BOOL *pfVerificationFlagChecked
);
```

Parameters pTaskConfig

[in] Pointer to a TASKDIALOGCONFIG structure that contains information used to display the task dialog.

pnButton

[out] Pointer to an integer location that receives one of button IDs specified in the pbuttons member of the pTaskConfig parameter or one of the following values:

| | |
|---|---|
| 0 | Function call failed. Refer to return value for more information. |
| IDCANCEL | Cancel button was selected, Alt-f4 was pressed, Escape was pressed or the user clicked on the close window button |
| IDNO | No button was selected. |
| IDOK | OK button was selected. |
| IDRETRY | Retry button was selected. |
| IDYES | Yes button was selected. |

If this value is NULL, no value is returned.

pfVerificationFlagChecked

[out] Pointer to a BOOL location that receives one receives one of the following values:

TRUE The verification checkbox was checked when the dialog was dismissed.

FALSE The verification checkbox was not checked when the dialog was dismissed.

If this value is NULL, no value is returned. If the pszVerificationText member of the TASKDIALOGCONFIG structure is specified and this value is null, then the verification checkbox will be displayed in the dialog, but it will be disabled. If this value is specified but the pszVerificationText member of the TASKDIALOGCONIG structure is not specified then it will be set based upon whether the VERIFICATION_FLAG_CHECKED flag is specified in the TASKDIALOGCONFIG structure.

Return Value

Returns S_OK if successful. If the operation fails, it returns an HRESULT which could be one of the following error codes.

| | |
|---|---|
| E_INVALIDARG | An invalid parameter was pass to the function. For example, a resource ID that does not exist in the module referred to by hInstance. |
| E_OUTOFMEMORY | The content of the dialog box was too big or complicated. |
| E_FAIL | An unexpected internal error was encountered. |

Remarks

When you use a task dialog box to indicate that the system is low on memory, the strings pointed to by the various string and icon s in TASKDIALOGCONFIG should not be taken from a resource file, because an attempt to load the resource may fail.

If you create a task dialog while a dialog box is present, use a handle to the dialog box as the hwndParent parameter. The hwndParent parameter should not identify a child window, such as a control in a dialog box.

Example

```
int nButtonPressed       = 0;
TASKDIALOGCONFIG config  = {0};
const TASKDIALOG_BUTTON buttons[ ] = {
                                { IDOK, L"Change password" }
                              };
config.cbSize             = sizeof(config);
config.hInstance          = hInst;
config.dwCommonButtons    = TDCBF_CANCEL_BUTTON;
config.pszMainIcon        = TD_WARNING_ICON;
config.pszMainInstruction = L"Change Password";
config.pszContent         = L"Remember your changed password.";
config.pButtons           = buttons;
config.cButtons           = ARRAYSIZE(buttons);
TaskDialogIndirect(&config, &nButtonPressed, NULL);
switch (nButtonPressed)
{
    case IDOK:
        break; // the user pressed button 0 (change password).
    case IDCANCEL:
        break; // user canceled the dialog
    default:
        break;// should never happen
}
```

APPENDIX C

TASKDIALOGCONFIG Structure

The TASKDIALOGCONFIG structure contains information used to display a task dialog. The TaskDialogIndirect function uses this structure.

Syntax

```
typedef struct {
    UINT cbSize;
    HWND hwndParent;
    HINSTANCE hInstance;
    DWORD dwFlags;
    DWORD dwCommonButtons;
    PCWSTR pszWindowTitle;
    union
    {
        HICON hMainIcon;
        PCWSTR pszMainIcon;
    };
    PCWSTR pszMainInstruction;
    PCWSTR pszContent;
    UINT cButtons;
    const TASKDIALOG_BUTTON *pButtons;
    int iDefaultButton;
    PCWSTR pszVerificationText;
    PCWSTR pszExpandedInformation;
    PCWSTR pszExpandedControlText;
    PCWSTR pszCollapsedControlText,
    union
    {
        HICON hFooterIcon;
        PCWSTR pszFooterIcon;
    };
    PCWSTR pszFooterText;
    TASKDIALOGPROG pfCallbackFunc;
    DWORD_PTR dwRefData;
} TASKDIALOGCONFIG;
```

Members cbSize

Specifies the structure size, in bytes.

hwndParent

Handle to the parent window. This member can be NULL.

hInstance

Handle to the module that contains the icon resource identified by the pszMainIcon orpszFooterIcon members, and the string resource identified by the pszWindowTitle, pszMainInstruction, pszContent, psz Verification Text, pszExpandedInformation, pszExpandedControlText, pszCollapsedControlText or pszFooterText members.

dwFlags

Specifies the behavior of the dialog box. This parameter can be a combination of flags from the following group.

TDF_ENABLE_HYPERLINKS

Enables hyperlink processing for the strings specified in the pszContent, pszExpandedInformation and pszFooterText members. When enabled, these members may point to strings that contain hyperlinks in the form <A HREF="executablestring">Hyperlink Text</A>. WARNING: Enabling hyperlinks when using content from an unsafe source may cause security vulnerabilities.

TDF_USE_HICON_MAIN

Indicates that the dialog should use the icon referenced by handle in the hMainIcon member as the primary icon in the dialog box. If this flag is specified the pszMainIcon member is ignored.

TDF_USE_HICON_FOOTER

Indicates that the dialog should use the icon referenced by handle in the hFooterIcon member as the footer icon in the dialog box. If this flag is specified the pszFooterIcon member is ignored.

TDF_ALLOW_DIALOG_CANCELLATION

Indicates that the dialog should be able to be closed using Alt-F4, Escape and the title bar's close button even if no cancel button is specified in either the dwCommonButtons or pButons members.

TDF_USE_COMMAND_LINKS

Indicates that the buttons specified in the pButtons member should be displayed as command links using a standard task dialog glyph instead of push buttons. When using command links, the pszButtonText member TASKDIALOG_BUTTON structure is interpreted as all characters up to first new line character will be treated as the command link's main text and the remainder will be treated as the command link's note. This flag is ignored if the cbuttons member is zero.

TDF_USE_COMMAND_LINKS_NO_ICON

Indicates that the buttons specified in the pButtons member should be displayed as command links without a glyph instead of push buttons. When using command links, the pszButtonText member TASKDIALOG_BUTTON structure is interpreted as all characters up to first new line character will be treated as the command link's main text and the remainder will be treated as the command link's note. This flag is ignored if the cButtons member is zero.

TDF_EXPAND_FOOTER_AREA
Indicates that string specified by the pszExpandedInformation member should be displayed a the bottom of the dialogs footer area instead of immediately after the dialog's content. This flag is ignored if thepszExpandedInformation member is NULL.

TDF_EXPANDED_BY_DEFAULT
Indicates that string specified by the pszExpandedInformation member should be displayed when the dialog in initially displayed. This flag is ignored if the pszExpandedInfornation member is NULL.

TDF_VERIFICATION_FLAG_CHECKED
Indicates that the verification checkbox in the dialog should be checked when the dialog is initially displayed. This flag is ignored if the pszVerificationText parameter is NULL.

TDF_CALLBACK_TIMER
Indicates that the TaskDialog's callback should be called approximately every 200 milliseconds.

TDF_SHOW_PROGRESS_BAR
Indicates that a Progress Bar should be displayed.

TDF_SHOW_MARQUEE_PROGRESS_BAR
Indicates that an Marquee Progress Bar should be displayed.

dwCommonButtons
Specifies the push buttons displayed in the dialog box. This parameter may be a combination of flags from the following group.

TDCBF_OK_BUTTON
The task dialog contains the push button: OK
TDCBF_YES_BUTTON
The task dialog contains the push button: Yes.
TDCBF_NO_BUTTON
The task dialog contains the push button: No.
TDCBF_CANCEL_BUTTON
The task dialog contains the push button: Cancel. If this button is specified the dialog box will respond to typical cancel actions: Alt-F4 and Escape;
TDCBF_RETRY_BUTTON
The task dialog contains the push button: Retry.

If no common buttons are specified and no custom buttons are specified using the cButtons and pButtons members, the dialog box will contain the OK button by default.

pszWindowTitle
Pointer that references the string to be used for the dialog box title. This parameter can be either a null-terminated string or an integer resource identifier passed to the MAKEINTRESOURCE macro. If this parameter is NULL, the filename of the executable program is used.

hMainIcon
A handle to an Icon that is to be displayed in the dialog box. This member is ignored unless the USE_HICON_MAIN flag is specified. If this member is NULL and the USE_HICON_MAIN is specified, no icon will be displayed.

pszMainIcon
Pointer that references the icon to be displayed in the dialog box. This parameter must be an integer resource identifier passed to the MAKEINTRESOURCE macro or one of the following predefined values:

TD_ERROR_ICON
A stop-sign icon appears in the task dialog.
TD_WARNING_ICON
An exclamation-point icon appears in the dialog box.
TD_INFORMATION_ICON
An icon consisting of a lowercase letter i in a circle appears in the task dialog.
TD_QUESTIONMARK_ICON
A question-mark icon appears in the task dialog.

This parameter is ignored if the USE_HICON_MAIN flag is specified. Otherwise, if this parameter is NULL or the hinstance parameter is NULL, no icon will be displayed.

pszMainInstruction
Pointer that references the string to be used for the main instruction. This parameter can be either a null-terminated string or an integer resource identifier passed to the MAKEINTRESOURCE macro.

pszContent
Pointer that references the string to be used for the dialog's primary content. This parameter can be either a null-terminated string or an integer resource identifier passed to the MAKEINTRESOURCE macro. If the ENABLE_HYPERLINKS flag is specified for the dwFlags member, then this string may contain hyperlinks in the form <A HREF="executablestring">Hyperlink Text</A>.

WARNING: Enabling hyperlinks when using content from an unsafe source may cause security vulnerabilities.

cbuttons
Indicates the number of entries in the pbuttons array that should be used to create buttons or command links in the dialog. If this member is zero and no common buttons have been specified using the dwCommonButtons member, then the dialog box will have a single OK button displayed.

pButtons
Pointer to an array of TASKDIALOG_BUTTON structures containing the definition of the custom buttons that are to be displayed in the dialog. This array must contain at least the number of entries that are specified by the cbuttons member.

iDefaultButton
Indicates the default button for the dialog. This may be any of the values specified in nButtonID members of one of the TASKDIALOG_BUTTON structures in the pbuttons array, or one of the IDs corresponding to the buttons specified in the dwCommonButtons member.

| IDCANCEL | Make the Cancel button the default. |
| IDNO | Make the No button the default. |
| IDOK | Make the OK button the default. |
| IDRETRY | Make the Retry button the default. |
| IDYES | Make the Yes button the default. |

If this member is zero or its value does not correspond to any button ID in the dialog, then the first button in the dialog will be the default.

pszVerificationText
Pointer that references the string to be used to label the verification checkbox. This parameter can be either a null-terminated string or an integer resource identifier passed to the MAKEINTRESOURCE macro. If this parameter is NULL, the verification checkbox is not displayed in the dialog box.

pszExpandedInformaton
Pointer that references the string to be used for displaying additional information. This parameter can be either a null-terminated string or an integer resource identifier passed to the MAKEINTRESOURCE macro. The additional information is displayed either immediately below the content or below the footer text depending on whether the EXPAND_FOOTER_AREA flag is specified. If the ENABLE_HYPERLINKS flag is specified for the dwFlags member, then this string may contain hyperlinks in the form <A HREF="executablestring">Hyperlink Text</A>.

WARNING: Enabling hyperlinks when using content from an unsafe source may cause security vulnerabilities.

pszExpandedControlText

Pointer that references the string to be used to label the button for collapsing the expanded information. This parameter can be either a null-terminated string or an integer resource identifier passed to the MAKEINTRESOURCE macro. This member is ignored when the pszExpandedInformation member is NULL. If this member is NULL and the pszCollapsedControlText is specified, then the pszCollapsedControlText value will be used for this member as well.

pszCollapsedControlText

Pointer that references the string to be used to label the button for expanding the expanded information. This parameter can be either a null-terminated string or an integer resource identifier passed to the MAKEINTRESOURCE macro. This member is ignored when the pszExpandedInformnation member is NULL. If this member is NULL and the pszExpandedControlText is specified, then the pszExpandedControlText value will be used for this member as well.

hFooterIcon

A handle to an Icon that is to be displayed in the footer of the dialog box. This member is ignored unless the USE_HICON_FOOTER flag is specified and the pszFooterIcon variable must not be NULL. If this member is NULL and the USE_HICON_FOOTER is specified, no icon will be displayed.

pszFooterIcon

Pointer that references the icon to be displayed in the footer area of the dialog box. This parameter must be an integer resource identifier passed to the MAKEINTRESOURCE macro or one of the following predefined values:

TD_ERROR_ICON

A stop-sign icon appears in the task dialog.

TD_WARNING_ICON

An exclamation-point icon appears in the dialog box.

TD_INFORMATION_ICON

An icon consisting of a lowercase letter i in a circle appears in the task dialog.

This parameter is ignored if the USE_HICON_FOOTER flag is specified. Otherwise, if this parameter is NULL or the hinstance parameter is NULL, no icon will be displayed.

pszFooterText

Pointer that references the string to be used in the footer area of the dialogbox. This parameter can be either a null-terminated string or an integer resource identifier passed to the MAKEINTRESOURCE macro. If the ENABLE_HYPERLINKS flag is specified for the dwFlags member, then this string may contain hyperlinks in the form <A HREF="executablestring">Hyperlink Text</A>.

WARNING: Enabling hyperlinks when using content from an unsafe source may cause security vulnerabilities.

pjCallbackFunc

Pointer to an application-defind callback function. For more information see TaskDialogCallbackProc.

dwRefData

DWORD_PTR to reference data. This value is defined by the caller.

APPENDIX D

TASKDIALOG_BUTTON Structure

The TASKDIALOG_BUTTON structure contains information used to display a task dialog. The TASKDIALOG-CONFIG structure uses this structure.

Syntax

```
typedef struct {
    int nButtonID;
    PCWSTR pszButtonText;
} TASKDIALOG_BUTTON;
```

Members nButtonID

Indicates the value to be returned when this button is selected.

pszButtonText

Pointer that references the string to be used to label the button. This parameter can be either a null-terminated string or an integer resource identifier passed to the MAKEINTRESOURCE macro. When using Command Links, you delineate the command from the explanations by placing a new line character in the string.

APPENDIX E

TaskDialogCallbackProc Function

The TaskDialogCallbackProc function is an application-defined function used with the TaskDialogIndirect function. It receives messages from the Task Dialog when various events occur. TaskDialogCallbackProc is a placeholder for the application defined function name.

Syntax

```
LRESULT TaskDialogCallbackProc(
    HWND hwnd,
    UINT uNotification,
    WPARAM wParam,
    LPARAM lpRefData,
    DWORD_PTR dwRefData
);
```

Parameters hwnd

[in] Handle to the TaskDialog window.

uNotification

[in] One of the following notifications.

| Notification | Usage |
| --- | --- |
| TDN_CREATED | Indicates that the Task Dialog has been created. |
| TDN_BUTTON_CLICKED | Indicates that a button has been selected. |
| TDN_HYPERLINK_CLICKED | Indicates that a hyperlink has been clicked. |
| TDN_TIMER | Indicates that the Task Dialog timer has fired. |
| TDN_DESTROYED | Indicates that the Task Dialog has been destroyed. | wParam

[in] Specifies additional notification information. The contents of this parameter depends on the value of the uNotification parameter.

lParam

[in] Specifies additional notification information. The contents of this parameter depends on the value of the unotification parameter.

dwRefData

[in] Specifies the application-defined value given in TaskDialoglnternalCallback.

Return Value

The return value is specific to the notification being processed.

Remarks

An application must register this callback function by passing its address in the pfCallbackFunc member of the pTaskConfig parameter to TaskDialogInternalCall.

APPENDIX F

TDN_CREATED Notification

The TDN_CREATED notification is sent by the Task Dialog once the dialog has been created and before it is displayed.
Syntax
TDN_CREATED
Parameters
Return Value
The return value is ignored.

APPENDIX G

TDN_NAVIGATED Notification

The TDN_NAVIGATED notification is sent by the Task Dialog when a navigation has occurred.
Syntax
TDN_NAVIGATED
Parameters
Return Value
The return value is ignored.

APPENDIX H

TDN_BUTTON_CLICKED Notification

The TDN_BUTTON_CLICKED notification is sent by the Task Dialog when the user selects a button or command link in the task dialog.
Syntax ---
TDN_BUTTON_CLICKED
wParam = (WPARAM) (int) nButtonID
---

Parameters
nButtonID
[in] The button ID corresponding to the button selected.
Return Value
To prevent the Task Dialog from closing, the application must return TRUE, otherwise the Task Dialog will be closed and the button ID returned to via the original application call.

APPENDIX I

TDN_HYPERLINK_CLICKED Notification

The TDN_HYPERLINK_CLICKED notification is sent by the Task Dialog when the user clicks on a hyperlink in the Task Dialog's content.
Syntax ---
TDN_HYPERLINK_CLICKED
lParam = (LPARAM) (PCWSTR) pszHREF
---

Parameters
pszHREF
[in] Pointer to a wide-character string containing the HREF of the hyperlink.
Return Value
To prevent the TaskDialog from shell executing the hyperlink, the application must return TRUE, otherwise ShellExecute will be called

APPENDIX J

TDN_TIMER Notification

The TDN_TIMER notification is sent by the Task Dialog approximately every 200 milliseconds when the TDF_CALLBACK_TIMER flag has been set in the dwFlags member of the pConfig parameter to the TaskDialogIndirect function.
Syntax ---
TDN_TIMER
wParam = (WPARAM) (DWORD) dwTickCount
---

Parameters
dwTickCount
[in] Number of milliseconds since the dialog was created or this notification returned TRUE.
Return Value
To reset the tickcount, the application must return TRUE, otherwise the tickcount will continue to increment.

APPENDIX K

TDN_DESTROYED Notification

The TDN_DESTROYED message is sent by the Task Dialog when it is destroyed and its window handle no longer valid.
Syntax
TDN_DESTROYED
Parameters
hwnd
[in] Handle to the TaskDialog window.
wParam
[in] Not used
lParam
[in] Not used
Return Value
The return value is ignored.

APPENDIX L

TDM_NAVIGATE_PAGE Message

The TDM_NAVIGATE_PAGE message is used to refresh the contents of the TaskDialog.
Syntax
To send this message, call the SendMessage function as follows.

---
lResult = SendMessage(           // returns LRESULT in lResult
    (HWND) hwndTaskDialog,       // handle to TaskDialog
    (UINT) uMesasge,             // = TDM_NAVIGATE_PAGE,
    (WPARAM) wParam,             // = 0; not used, must be zero
    (LPARAM) lParam              // = (LPARAM)
                                 (TASKDIALOGCONFIG*) pTaskConfig
);
---

Parameters pTaskConfig

[in] Pointer to a TASKDIALOGCONFIG structure that contains information used to display the task dialog.

Return Value

If the function succeeds, the return value is non-zero.

Remarks

The value returned from processing this message only applies the actual posting of the message to the TaskDialog, not the layout of the TaskDialog. If the layout of the TaskDialog fails, the dialog will close and an HRESULT will be returned to the application that originally called TaskDilaogInternalCallback.

The entire contents of the dialog frame is destroyed and reconstructed. Hence any state information held by controls in the dialog (such as the progress bar, expando or verification checkbox) is lost.

APPENDIX M

TDM_CLICK_BUTTON Message

The TDM_SELECT_BUTTON message is used to simulate the action of a button click in the TaskDialog.

Syntax

To send this message, call the SendMessage function as follows.

```
lResult = SendMessage(           // returns LRESULT in lResult
    (HWND) hwndTaskDialog,       // handle to TaskDialog
    (UINT) uMesasge,             // = TDM_SELECT_BUTTON,
    (WPARAM) wParam,             // = (WAPRAM) (int) nButton
    (LPARAM) lParam              // = 0; not used, must be zero
);
```

Parameters nButton

[in] Indicates the button ID to be selected.

lParam

[in] Must be zero.

Return Value

If the function succeeds, the return value is non-zero.

Remarks

It is not necessary for the button ID passed to this function to actually exist in the TaskDialog at the time it is called.

The value returned from processing this message only applies the actual processing of the message, and not any processing that may occur due to the action being invoked. For example, if the TaskDialog callback function fails, the dialog will close and an HRESULT will be returned to the application that originally called TaskDilaogInternalCallback.

APPENDIX N

TDM_SET_MARQUEE_PROGRESS_BAR Message

The TDM_SET_MARQUEE_PROGRESS_BAR message is used to indicate whether the hosted progress bar should be displayed in marquee mode or not.

Syntax

To send this message, call the SendMessage function as follows.

```
lResult = SendMessage(           // returns LRESULT in lResult
    (HWND) hwndTaskDialog,       // handle to TaskDialog
    (UINT) uMesasge,             // = TDM_SET_MARQUEE_PROGRESS_BAR
    (WPARAM) wParam,             // = (WPARM) (BOOL) fMarquee
    (LPARAM) lParam              // = 0; not used, must be 0
);
```

Parameters fMarquee

[in] Specifies whether the progress bar should be shown in Marquee mode. A value of TRUE turns on Marquee mode.

Return Value

If the function succeeds, the return value is non zero.

If the function fails, the return value is zero. To get extended error information call GetLastError.

APPENDIX O

TDM_SET_PROGRESS_BAR_STATE Message

The TDM_SET_PROGRESS_BAR_STATE message is used to indicate whether the hosted progress bar should be displayed in marquee mode or not.

Syntax

To send this message, call the SendMessage fimction as follows.

```
lResult = SendMessage(           // returns LRESULT in lResult
    (HWND) hwndTaskDialog,       // handle to TaskDialog
    (UINT) uMesasge,             // = TDM_SET_PROGRESS_BAR_STATE
    (WPARAM) wParam,             // = (WPARAM) (int) nNewState
    (LPARAM) lParam              // = 0; not used, must be 0
);
```

Parameters nNewState

Specifies the bar state. This parameter can be one of the following values.

PBST_NORMAL

Sets the button state to the normal state.

PBST_PAUSE

Sets the progress bar to the paused state.

PBST_ERROR

Set the progress to the error state.

Return Value

If the function succeeds, the return value is non zero.

If the function fails, the return value is zero. To get extended error information call GetLastError.

APPENDIX P

TDM_SET_PROGRESS_BAR_RANGE Message

The TDM_SET_PROGRESS_BAR_RANGE message is used set the minimum and maximum values for the hosted progress bar.

Syntax

To send this message, call the SendMessage function as follows.

```
lResult = SendMessage(        // returns LRESULT in lResult
    (HWND) hwndTaskDialog,    // handle to TaskDialog
    (UINT) uMesasge,          // = TDM_SET_PROGRESS_BAR_RANGE
    (WPARAM) wParam,          // = (WPARAM) 0; not used, must be 0
    (LPARAM) lParam           // = (LPARAM) MAKELPARAM(nMinRange, nMaxRange)
);
```

Parameters nMinRnage

Minimum range value. By default, the minimum value is zero.

nMaxRnage

Maximum range value. By default, the maximum value is 100.

Return Value

Returns the previous range values if successful, or zero otherwise.

APPENDIX Q

TDM_SET_PROGRESS_BAR_POS Message

The TDM_SET_PROGRESS_BAR_POS message is used set the current position for a progress bar.

Syntax

To send this message, call the SendMessage function as follows.

```
lResult = SendMessage(        // returns LRESULT in lResult
    (HWND) hwndTaskDialog,    // handle to TaskDialog
    (UINT) uMesasge,          // = TDM_SET_PROGRESS_BAR_POS
    (WPARAM) wParam,          // = (WPARAM) (int) nNewPos
    (LPARAM) lParam           // = (LPARAM) 0; not used, must be 0
);
```

Parameters nNewPos

Signed integer that becomes the new position.

Return Value

Returns the previous position.

APPENDIX R

TDM_SET_PROGRESS_BAR_MARQUEE Message

The TDM_SET_PROGRESS_BAR_MARQUEE message is used to indicate whether a marquee progress bar is in motion or not.

Syntax

To send this message, call the SendMessage function as follows.

```
lResult = SendMessage(        // returns LRESULT in lResult
    (HWND) hwndTaskDialog,    // handle to TaskDialog
    (UINT) uMesasge,          // = TDM_SET_PROGRESS_BAR_MARQUEE
    (WPARAM) wParam,          // = (WPARM) (BOOL) fMarquee
    (LPARAM) lParam           // = (LPARAM) (UINT) nSpeed
);
```

Parameters fMarquee

[in] Indicates whether to turn the marquee mode off or on.

nSpeed

[in] Indicates the speed of the marquee in milliseconds.

Return Value

Returns whether marquee mode is set.

The invention claimed is:

1. A method of creating a dialog user interface at the request of at least two computer programs having one or more files, comprising:
(a) receiving from one of the at least two computer programs a request to generate a dialog user interface, the request at least including:
(i) a main instruction to be displayed within the dialog, wherein the main instruction is one of a concise sentence, a question, and an instruction to a user displayed prominently in the dialog,
(ii) at least one user interface control, to be provided as part of the dialog, permitting a computer user to respond to the dialog, wherein the user interface control specifies a type of graphical element that the user can select to interact with the computer program that requested the dialog,
(iii) text supplemental to the main instruction that will be displayed in one of two optional supplemental regions, wherein the supplemental text specifies one or more of text to be displayed that provides guidance to the user regarding the main instruction and whether one or more hyperlink should be enabled,
(iv) a window title, wherein the window title is one of the name of one of the at least two computer programs that caused the request to generate a dialog user interface, a command in one of the at least two computer programs that caused the request to generate a dialog user interface, and a title to be for the task dialog window title, and (v) a storage location for recording the computer user's response to the dialog through the at least one user interface control; and (b) generating the dialog in response to the received instruction, wherein (i) the main instruction is located within the dialog, the size and location of the main instruction determined by at least one theme file containing data specifying a common set of dialog display parameters that control the display characteristics of dialog user interfaces of the at least two computer programs, the at least one theme file being distinct from the one or more files of the computer program requesting generation of the dialog and each theme file being accessible by more than one computer program to generate dialog, (ii) the supplemental text is sized and located within the dialog so as to be distinguishable from the main instruction based on the supplemental text received specifying one or more of text that provides guidance to the user regarding the main instruction and whether a hyperlink should be enabled, the size and location of the supplemental text being specified by the at least one theme file, wherein the hyperlink is enabled based on the received supplemental text specifying whether a hyperlink should be enabled, (iii) the at least one user interface control allowing the user to interact with the computer program that requested the dialog is sized and located within the dialog based on the at least one user interface control received and data from the at least one theme file, and (iv) the window title is located within the dialog, the size and location of the window title determined by at least one theme file.

2. The method of claim 1, wherein:
the request received in step (a) includes data specifying which of at least two supplemental text regions is to contain the supplemental text,
the dialog is generated in step (b) so as to contain the supplemental text in the specified supplemental text region, and
the size and location of the supplemental text within the specified supplemental text region is specified by the at least one theme file.

3. The method of claim 2, wherein one of the at least one supplemental text regions comprises either a footer region located beneath a region of the dialog containing the at least one user interface control, or a content region located above a region of the dialog containing the at least one user interface control and beneath a region of the dialog containing the main instruction.

4. The method of claim 1, wherein step (a) comprises receiving the request in a single programming interface call.

5. The method of claim 2, wherein:
the request received in step (a) includes additional text to be displayed with the supplemental text, and
the dialog is generated in step (b) so as to either
(1) display the additional text with the supplemental text within the specified supplemental text region and to provide an additional user interface control, the additional user interface control selectable by the user to collapse the specified supplemental text region so as to display the supplemental text without the additional text, or
(2) display the supplemental text without the additional text within the specified supplemental text region and to provide an additional user interface control, the additional user interface control selectable by the user to expand the specified supplemental text region so as to display the supplemental and the additional text.

6. The method of claim 1, wherein:
the request received in step (a) includes text for inclusion in a content region and data indicative of text for inclusion in a footer region,
the dialog is generated in step (b) so as to locate the content region above a region of the dialog containing the at least one user interface control and beneath a region of the dialog containing the main instruction,
the dialog is generated in step (b) so as to locate the footer region beneath a region of the dialog containing the at least one user interface control, and
the sizes and locations of the text within the content and footer regions are specified by the at least one theme file.

7. The method of claim 6, wherein the content region contains text having a font size smaller than a font size of the main instruction, the main instruction and content region font sizes being specified by the at least one theme file.

8. The method of claim 6, wherein:
the request of step (a) further specifying whether an icon is to be displayed in a region of the requested dialog containing the main instruction and data indicative of whether an icon is to be displayed in the footer region, and
step (b) further comprises displaying icons in the main instruction and footer regions, the locations and sizes of the displayed icons being specified by the at least one theme file.

9. A computer storage medium having stored thereon data representing sequences of instructions which, when executed by a processor, cause the processor to perform steps of a method for creating a dialog user interface at the request of at least two computer programs having one or more files, the steps comprising:

(a) receiving from one of the at least two computer programs a request to generate a dialog user interface, the request at least including (i) a main instruction to be displayed within the dialog, wherein the main instruction is one of a concise sentence, a question, and an instruction to a user displayed prominently in the dialog, (ii) at least one user interface control, to be provided as part of the dialog, permitting a computer user to respond to the dialog, wherein the user interface control specifies a type of graphical element that the user can select to interact with the computer program that requested the dialog, (iii) text supplemental to the main instruction that will be displayed in one of two optional supplemental regions, wherein the supplemental text specifies one or more of text to be displayed that provides guidance to the user regarding the main instruction and whether one or more hyperlink should be enabled, (iv) a window title, wherein the window title is one of the name of one of the at least two computer programs that caused the request to generate a dialog user interface, a command in one of the at least two computer programs that caused the request to generate a dialog user interface, and a title to be for the task dialog window title, and (v) a storage location for recording the computer user's response to the dialog through the at least one user interface control; and (b) generating the dialog in response to the received instruction, wherein (i) the main instruction is located within the dialog, the size and location of the main instruction determined by at least one theme file containing data specifying a common set of dialog display parameters that control the display characteristics of dialog user interfaces of the at least two computer programs, the at least one theme file being distinct from the one or more files of the computer program requesting generation of the dialog and each theme file being accessible by more than one computer program to generate dialog, (ii) the supplemental text is sized and located within the dialog so as to be distinguishable from the main instruction based on the supplemental text received specifying one or more of text that provides guidance to the user regarding the main instruction and whether a hyperlink should be enabled, the size and location of the supplemental text being specified by the at least one theme file, wherein the hyperlink is enabled based on the supplemental text specifying whether a hyperlink should be enabled, (iii) the at least one user interface control allowing the user to interact with the computer program that requested the dialog is sized and located within the dialog based on the at least one user interface control received and data from the at least one theme file, and (iv) the window title is located within the dialog, the size and location of the window title determined by at least one theme file.

10. The computer storage medium of claim 9, wherein:
the request received in step (a) specifying which of at least two supplemental text regions is to contain the supplemental text,
the dialog is generated in step (b) so as to contain the supplemental text in the specified supplemental text region, and
the size and location of the supplemental text within the specified supplemental text region is specified by the at least one theme file.

11. The computer storage medium of claim 10, wherein one of the at least one supplemental text regions comprises either a footer region located beneath a region of the dialog containing the at least one user interface control, or a content region located above a region of the dialog containing the at least one user interface control and beneath a region of the dialog containing the main instruction.

12. The computer storage medium of claim 10, wherein step (a) comprises receiving the request in a single programming interface call.

13. The computer storage medium of claim 10, wherein:
the request received in step (a) includes additional text to be displayed with the supplemental text, and
the dialog is generated in step (b) so as to either
(1) display the additional text with the supplemental text within the specified supplemental text region and to provide an additional user interface control, the additional user interface control selectable by the user to collapse the specified supplemental text region so as to display the supplemental text without the additional text, or
(2) display the supplemental text without the additional text within the specified supplemental text region and to provide an additional user interface control, the additional user interface control selectable by the user to expand the specified supplemental text region so as to display the supplemental and the additional text.

14. The computer storage medium of claim 9, wherein:
the request received in step (a) includes text for inclusion in a content region and text for inclusion in a footer region,
the dialog is generated in step (b) so as to locate the content region above a region of the dialog containing the at least one user interface control and beneath a region of the dialog containing the main instruction,
the dialog is generated in step (b) so as to locate the footer region beneath a region of the dialog containing the at least one user interface control, and
the sizes and locations of the text within the content and footer regions are specified by the at least one theme file.

15. The computer storage medium of claim 14, wherein the content region contains text having a font size smaller than a font size of the main instruction, the main instruction and content region font sizes being specified by the at least one theme file.

16. The computer storage medium of claim 14, wherein:
the request of step (a) further specifying whether an icon is to be displayed in a region of the requested dialog containing the main instruction and specifying whether an icon is to be displayed in the footer region, and
step (b) further comprises displaying icons in the main instruction and footer regions, the locations and sizes of the displayed icons being specified by the at least one theme file.

17. The computer storage medium of claim 9, wherein step (b) comprises:
(iv) determining whether the request of step (a) includes one or more user interface control having one of a collection of predefined commands, and
(v) determining whether the request of step (a) includes one or more user interface control and of command text, for display as part of said control, which is not part of the collection of predefined commands.

18. A system for creating dialog user interfaces, comprising:
a digital display device including a display screen;
a processor controlling at least some operations of the system; and
a memory storing computer executable instructions that when executed by the processor, cause the system to perform a method for creating a dialog user interface, wherein said computer executable instructions comprise:
(a) an operating system software component configured to:
generate a dialog user interface on the digital display device,
wherein the operating system software component includes at least one theme file containing one or more values specifying to a common set of dialog display parameters that control the display characteristics of dialog user interfaces of multiple different computer programs, and each theme file being accessible by more than one computer programs to generate dialog,
wherein the generated dialog user interface has a format defined by the operating system software component, the format including a main instruction located within the dialog, the size and location of the main instruction being specified by the at least one theme file,
wherein the format further includes supplemental text sized and located within the dialog so as to be distinguishable from the main instruction based on supplemental text received specifying one or more of text that provides guidance to the user regarding the main instruction and whether a hyperlink should be enabled, the size and location of the supplemental text being specified by the at least one theme file and the hyperlink is enabled based on the supplemental text specifying whether a hyperlink should be enabled, wherein the format further includes at least one user interface control allowing the user to interact with the computer program that requested the dialog sized and located within the dialog based on at least one user interface control received from one of the more than one computer programs and data from the at least one theme file, and wherein the format further includes a window title located within the dialog, the size and location of the window title being specified by the at least one theme file;

(b) at least one application program interface configured to:

receive the main instruction which is one of a concise sentence, a question, and an instruction to a user displayed prominently in the dialog, the at least one user interface control specifying a type of graphical element that the user can select to interact with the computer program that requested the dialog, the supplemental text specifying one or more of text to be displayed that provides guidance to the user regarding the main instruction and whether one or more hyperlink should be enabled, the window title which is one of the name of one of the at least two computer programs that caused the request to generate a dialog user interface, a command in one of the at least two computer programs that caused the request to generate a dialog user interface, and a title to be for the task dialog window title; and access the operating system software component.

* * * * *